(12) United States Patent
Tai et al.

(10) Patent No.: US 6,799,521 B2
(45) Date of Patent: Oct. 5, 2004

(54) AUTOMATED GUIDED VEHICLE SYSTEM

(75) Inventors: Akito Tai, Kagamigahara (JP); Hideji Sakata, Inuyama (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 0 days.

(21) Appl. No.: 10/453,650

(22) Filed: Jun. 4, 2003

(65) Prior Publication Data

US 2003/0229416 A1 Dec. 11, 2003

(30) Foreign Application Priority Data

Jun. 6, 2002 (JP) .......................................... 2002-165355
Jun. 6, 2002 (JP) .......................................... 2002-165376

(51) Int. Cl.[7] .................................................. B61J 3/00
(52) U.S. Cl. ................................................... 104/88.01
(58) Field of Search ............................ 104/88.01, 89, 104/90, 91, 96, 98; 105/148, 149

(56) References Cited

U.S. PATENT DOCUMENTS

| | | | | |
|---|---|---|---|---|
| 4,939,999 A | * | 7/1990 | Burt et al. ..................... | 104/89 |
| 5,111,750 A | * | 5/1992 | Nozaki et al. ............ | 104/88.03 |
| 5,568,770 A | * | 10/1996 | Ito et al. ................... | 104/88.01 |
| 5,964,562 A | * | 10/1999 | Bernard et al. ......... | 414/331.03 |
| 6,213,025 B1 | * | 4/2001 | Sauerwein et al. ......... | 104/121 |
| 6,726,429 B2 | * | 4/2004 | Sackett et al. .............. | 414/217 |

FOREIGN PATENT DOCUMENTS

| | | |
|---|---|---|
| JP | 10-203647 | 8/1998 |
| JP | 2002-53039 | 2/2002 |
| JP | 2002-96725 | 4/2002 |

* cited by examiner

Primary Examiner—S. Joseph Morano
Assistant Examiner—Robert J. McCarry, Jr.
(74) Attorney, Agent, or Firm—Westerman, Hattori, Daniels & Adrian, LLP

(57) ABSTRACT

The present invention provides an automated guided vehicle system that can transfer an article between an automated guided vehicle and an automatic warehouse on the basis of easy control. In an automated guided vehicle system 1, the vehicle 10A running on a running path is provided with a roller conveyor 8 used to transfer an article. Further, automatic warehouses 5 are each provided with an article storage and retrieval roller conveyor 51. The transfer roller conveyor 8, which runs with the vehicle 10A, and the storage and retrieval roller conveyor 51 are arranged in series and in proximity to each other in a carrying direction. An article 9 can be transferred between the vehicle 10A and the automatic warehouse 5. The bottom surface of the article 9 is formed as planar portions 9c, 9c at its laterally opposite ends in the carrying direction. The transfer roller conveyor 8 and storage and retrieval roller conveyor 51, which carry the article 9, are each provided with rows 81, 82 of rollers provided in the carrying direction. Planar portions at the opposite ends of each conveyor can be supported by the pair of roller rows 81, 82.

6 Claims, 16 Drawing Sheets

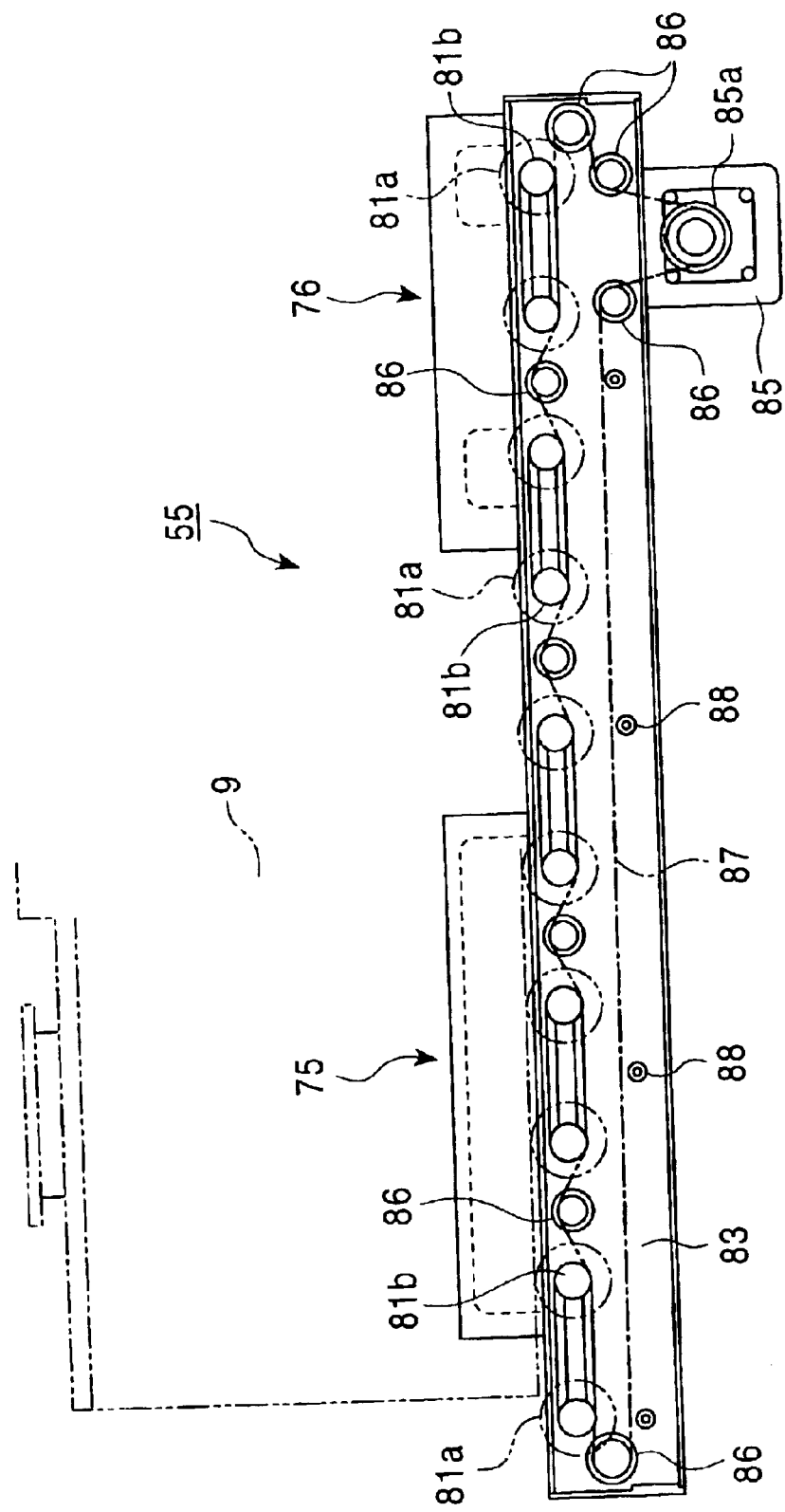

ained guided vehicle system comprising a running path suspended from a ceiling, article storages arranged along the running path, and an automated guided vehicle running along the running path, wherein the vehicle is provided with a transfer conveyor and each of the article storages is provided with a storage and retrieval conveyor and wherein the transfer conveyor and the storage and retrieval conveyor are arranged so as to approach each other so that an article can be transferred between the vehicle and the article storage.

AUTOMATED GUIDED VEHICLE SYSTEM

FIELD OF THE INVENTION

The present invention relates to an automated guided vehicle system comprising a running path, automatic warehouses provided along the running path, and an automated guided vehicle running on the running path.

BACKGROUND OF THE INVENTION

An automated guided vehicle system has been known which comprises a running path, automatic warehouses (article storages) provided along the running path, and an automated guided vehicle running on the running path. In such a system, to scoop up and transfer an article between the vehicle and each of the automatic warehouses, the automatic warehouse is provided with a horizontal articulated transfer device that advances and retreats in a plane. This transfer device transfers an article by advancing or retreating an arm with multiple rotary joints to or from the vehicle stopped at the side of the automatic warehouse to receive the article from the vehicle or deliver the article from the automatic warehouse to the vehicle.

To perform a transfer operation, the horizontal articulated transfer device must rotate each rotary joint to advance or retreat the arm, while elevating or lowering the arm. Thus, the arm must not only be drivingly controlled to advance and retreat but must also be drivingly controlled to elevate and lower. It is thus difficult to control the arm. Further, the horizontal articulated transfer device has a complicated configuration.

Thus, the present invention provides an automated guided vehicle system that can be easily controlled to transfer an article between the automated guided vehicle and the automatic warehouse.

An object of the present invention has been described above. Now, description will be given of means for accomplishing this object.

SUMMARY OF THE INVENTION

According to claim 1, there is provided an automated guided vehicle system comprising a running path suspended from a ceiling, article storages arranged along the running path, and an automated guided vehicle running along the running path, wherein the vehicle is provided with a transfer conveyor and each of the article storages is provided with a storage and retrieval conveyor and wherein the transfer conveyor and the storage and retrieval conveyor are arranged so as to approach each other so that an article can be transferred between the vehicle and the article storage.

In claim 2, a bottom surface of the article is formed to be planar at its laterally opposite ends in a carrying direction and the transfer conveyor and the storage and retrieval conveyor each have a pair of conveyor rows juxtaposed along the carrying direction so that the opposite ends of the bottom surface of the article can be supported by the pair of juxtaposed conveyor rows.

According to claim 3, there is provided an automated guided vehicle system comprising a running path including a plurality of first closed loop paths below each of which an article placement area is provided and a second closed loop path arranged along the corresponding first closed loop path, a first automated guided vehicle that runs along the first closed loop paths and that is provided with an elevating and lowering device to elevate or lower the article for transfer, and a second automated guided vehicle that runs along the second closed loop path and that includes a transfer conveyor, and wherein article storages are each arranged at a position where the article can be delivered between the first vehicle on the corresponding first closed loop path and the second vehicle on the corresponding second closed loop path, and the article storage has a first storage and retrieval conveyor provided at a height position lower than the first closed loop path to deliver and receive the article to and from the first vehicle and a second storage and retrieval conveyor provided at substantially the same height position as that of the transfer conveyor so that the second storage and retrieval conveyor and the transfer conveyor can approach each other, the second storage and retrieval conveyor being used to deliver and receive the article to and from the second vehicle.

In claim 4, the plurality of first closed paths and the second closed path are connected together, and the first vehicle runs along the first closed loop paths and the second closed loop path, while the second vehicle runs only along the second closed loop path.

In claim 5, the elevating and lowering device of the first vehicle elevates and lowers the article by moving the article along a running path in a vertical direction.

According to claim 6, there is provided an automated guided vehicle system comprising a running path including a plurality of first closed loop paths and second closed loop path connecting the first closed loop paths together, and an automated guided vehicle running on the running path, wherein article placement areas are provided below at least the corresponding first closed loop paths of the running path, and a first automated guided vehicle that runs along the first closed loop paths and a second automated guided vehicle that runs along the second closed loop path are provided, wherein article storages are each arranged at a position where the article can be delivered between the first vehicle on the corresponding first closed loop path and the second vehicle on the corresponding second closed loop path, and the first vehicle is provided with a elevating and lowering device that elevates or lowers the article for transfer to the first vehicle, while the second vehicle is provided with a transfer device that moves the article in a lateral direction to deliver and receive the article, and wherein an article delivery station provided in the article storage and closer to the second closed loop path is installed closer to the second closed loop path at substantially the same height position as that of the transfer device of the second vehicle.

BRIEF DESCRIPTION OF THE DRAWINGS

FIG. 9 is a side view (with respect to a carrying direction) showing a second storage and retrieval roller conveyor.

FIG. 10 is a front view (with respect to the carrying direction) showing a second storage and retrieval roller conveyor. In particular.

DETAILED DESCRIPTION OF THE PREFERRED EMBODIMENTS

Figure 1:
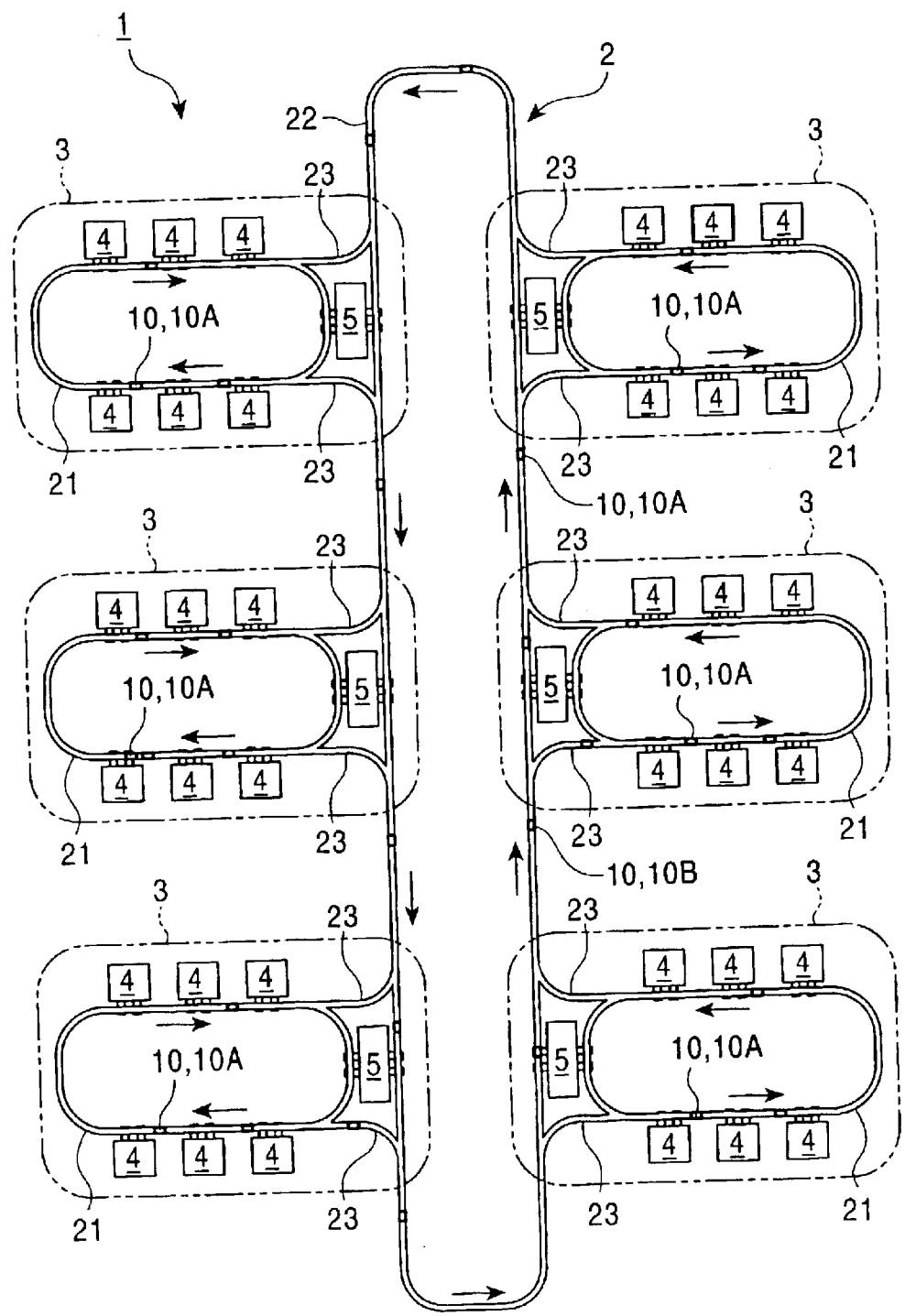
FIG. 1 is a plan view showing how a running path is laid in a clean room.

First, with reference to FIGS. 1 to 3, description will be given of an automated guided vehicle system 1 that is an embodiment of the present invention.

An automated guided system 1 is used in a clean room in a semiconductor fabricating plant or the like as means for carrying articles. As shown in FIG. 1, a clean room to which the automated guided vehicle system 1 is applied is provided with a plurality of working areas 3, 3, . . . and a running path 2 along which articles 9 are carried within each working area 3 and between the working areas 3, 3. The article 9 is, for example, a cassette in which semiconductor wafers are housed. The article 9 is carried by an automated guided vehicle (hereinafter referred to as a "vehicle") 10 running along the running path 2. The running path 2 is suspended from the ceiling of the clean room via suspending members 30, 30, . . . and is supported by the ceiling.

The running path 2 is provided with a plurality of intra-process carrying paths (first closed loop paths) 21, 21, . . . and inter-process carrying path (second closed loop path) 22 connecting the intra-process carrying paths 21, 21, . . . together. Processing devices 4, 4, . . . for the articles 9 are arranged along the intra-process carrying path 21 to enable the article 9 to be carried within the working area 3. Further, the inter-process carrying path 22 connect the intra-process carrying paths 21 together to enable the article 9 to be carried between the working areas 3, 3. Each intra-process carrying path 21 and the corresponding inter-process carrying path 22 are connected together via a connection path 23.

The automated guided vehicle system 1 in the present embodiment is provided with a first vehicle 10A running along both intra-process carrying paths 21 and inter-process carrying path 22, and a second vehicle 10B running along the inter-process carrying path 22. Each intra-process carrying path 21 and the corresponding inter-process carrying path 22 constitute a closed loop path. The vehicles 10A, 10B can move circularly on the carrying paths 21, 22. As described later in detail, the first vehicle 10A comprises a hoist 7 that is elevating and lowering means, as means for transferring the article 9. Further, the second vehicle 10B comprises a transfer roller conveyor 8 as means for transferring the article 9. The first vehicle 10A and the second vehicle 10B are driven by drive means, not shown in the drawings, and guided by guide means, not shown in the drawings, to run along the intra-process carrying paths 21 and the inter-process carrying path 22. In the description below, if it is unnecessary to distinguish the first vehicle 10A from the second vehicle 10B, they are collectively called a "vehicle 10".

Figure 2:
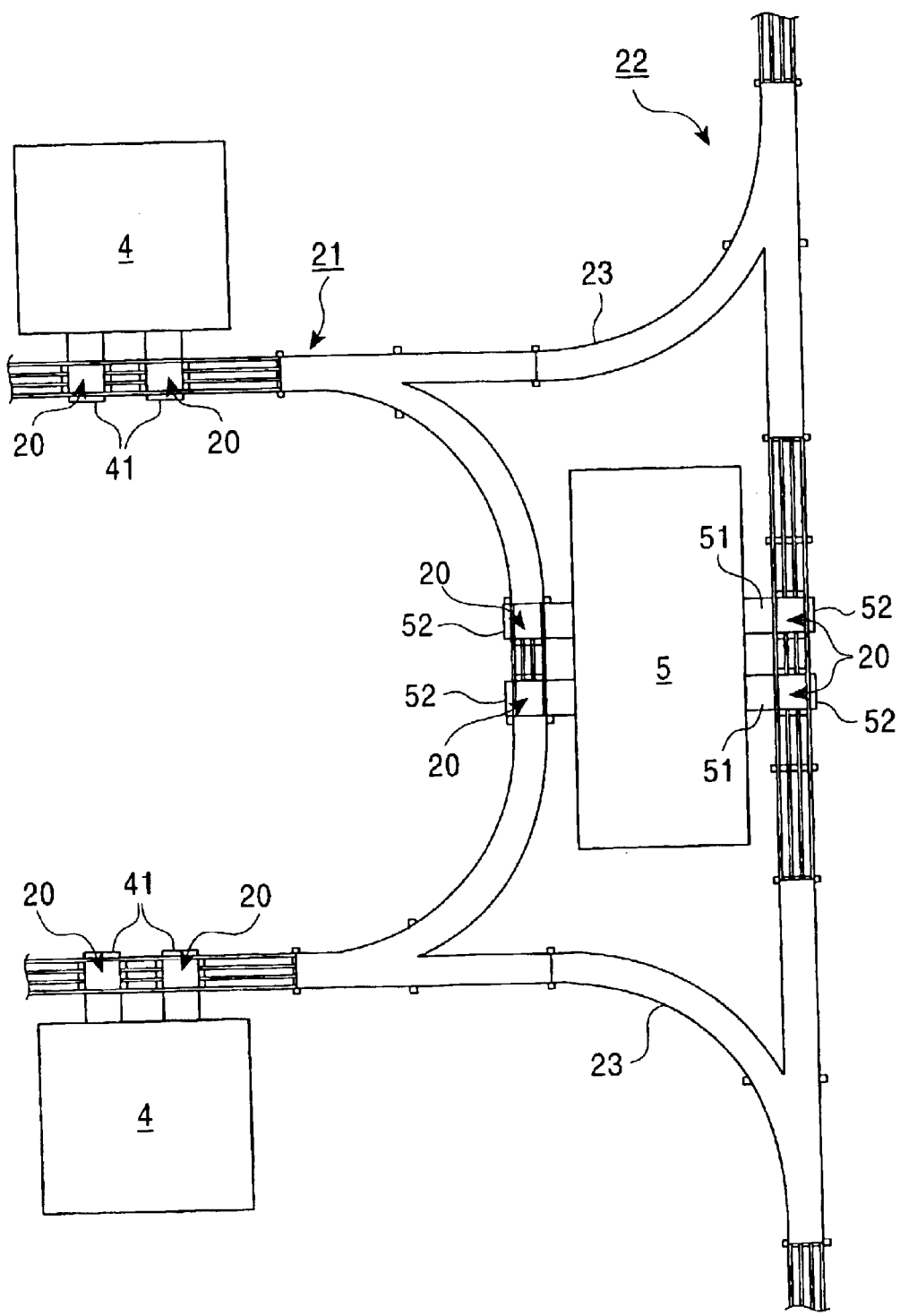
FIG. 2 is a plan view showing an automatic warehouses arranged along a running path.
Figure 3:
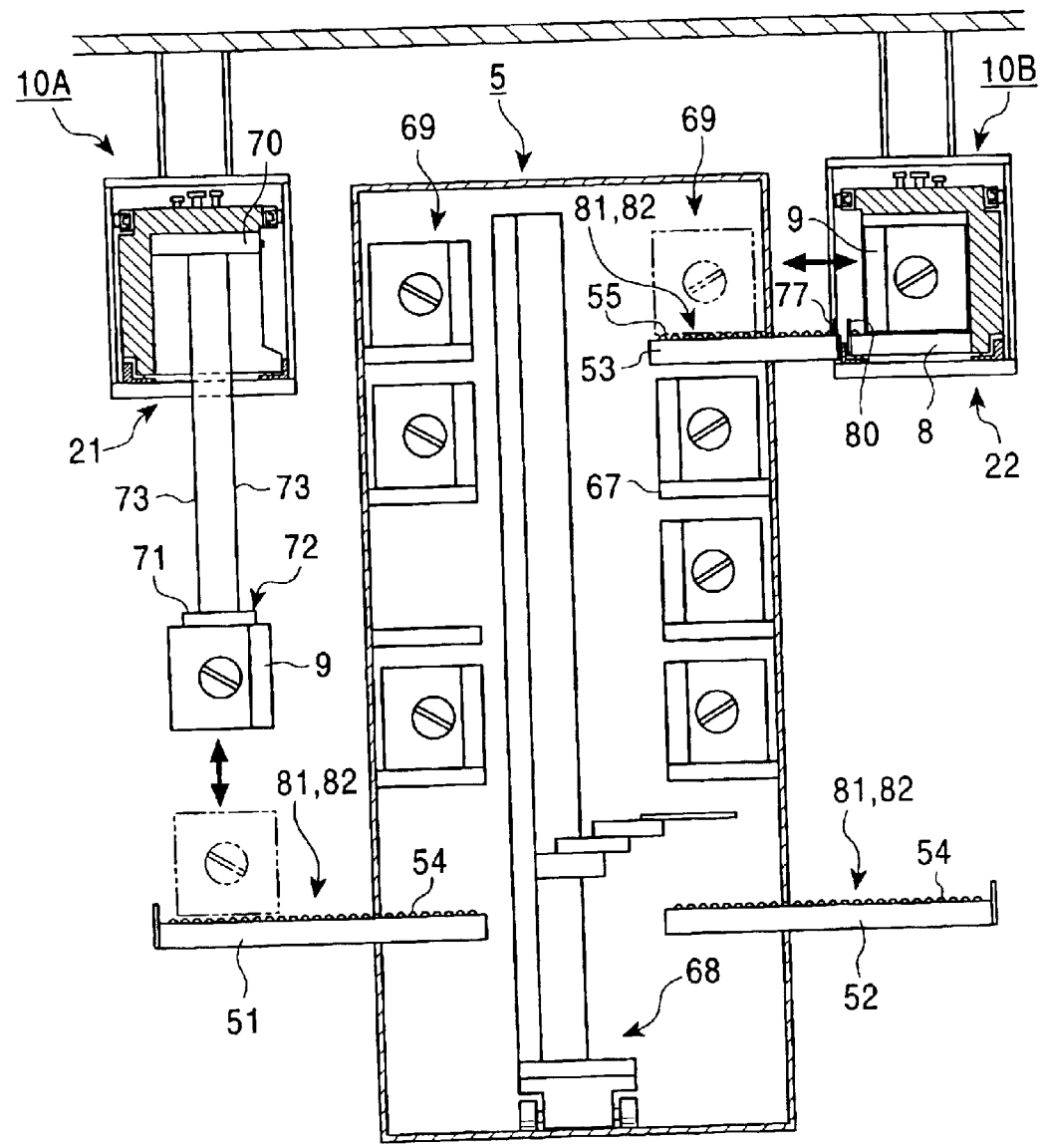
FIG. 3 is a sectional view showing how automated guided vehicles transfer an article to an automatic warehouse.

As shown in FIGS. 1 to 3, the first closed loop path 21 and the corresponding closed loop path 22 are coupled together via the connection path 23. Automatic warehouses 5 are each arranged in the space between a curved part of the corresponding first closed loop path 21 and a straight part of the corresponding second closed loop path 22 to temporarily store the article 9. The automatic warehouse 5 is arranged at an equal distance from both corresponding intra-process carrying path 21 and inter-process carrying path 22.

The automatic warehouse 5 is provided with stations 51, 52, 53 for the vehicles 10A, 10B. The station 51 corresponding to a transfer device on the vehicle 10A is provided with a first storage and retrieval roller conveyor 54. The stations 52, 53 corresponding to a transfer device on the vehicle 10B are each provided with a second storage and retrieval roller conveyor 55. The article 9 can be transferred between the vehicle 10 and the automatic warehouse 5 whether the vehicle 10 is running along the carrying path 21 or the carrying path 22.

The automatic warehouse 5 contains a pair of racks 69, 69 acting as a housing section for the article 9 and a stacker crane 68 that is transfer means. The rack 69 comprises a large number of shelves 67, 67, . . . disposed in the longitudinal direction (the direction in which the running path 2 is formed) and vertical direction of the automatic warehouse 5. Further, the stacker crane 68 is transfer means for transferring the article 9 between the first storage and retrieval roller conveyer 54 or the second storage and retrieval roller conveyor 55, acting as a storage and retrieval port of the automatic warehouse 5, and the shelf 67. The stacker crane 68 houses the article 9 placed on the storage and retrieval port (storage and retrieval roller conveyor 54, 55) of the automatic warehouse 5 and transfers the article 9 unloaded from the rack 69 to the storage and retrieval port of the automatic warehouse 5.

A configuration of the running path 2 will be described with reference to FIGS. 4 to 6. In the description below, the configuration of the running path 2 means the configuration of assembly of members such as rail members 24A, 43A which constitute the running path 2. It does not mean the purpose of each portion of the running path 2 (the purpose is, for example, the use of particular parts as the intra-process carrying paths 21).

Figure 4:
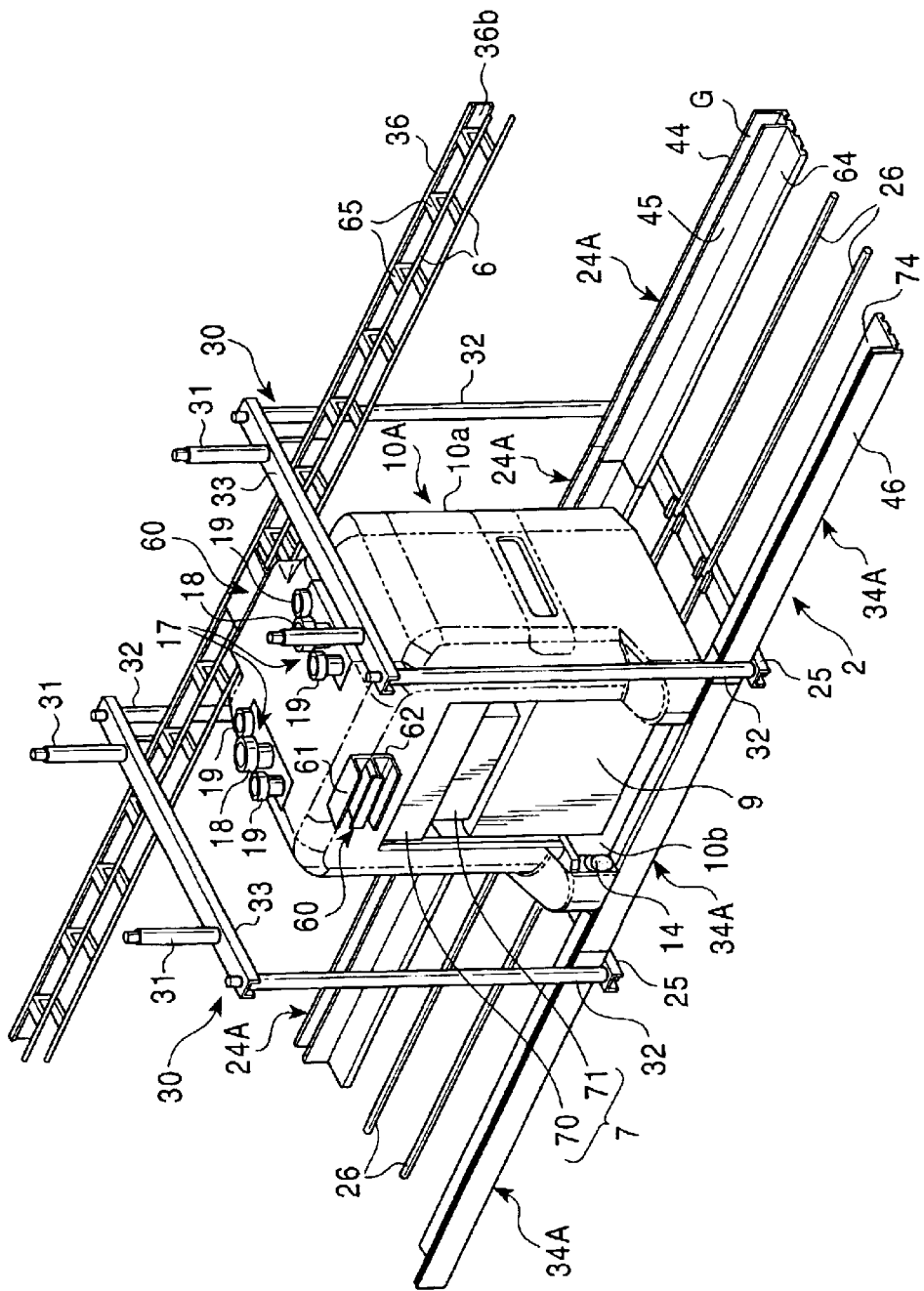
FIG. 4 is a perspective view showing a first automated guided vehicle that runs along a straight part of a running path.
Figure 5:
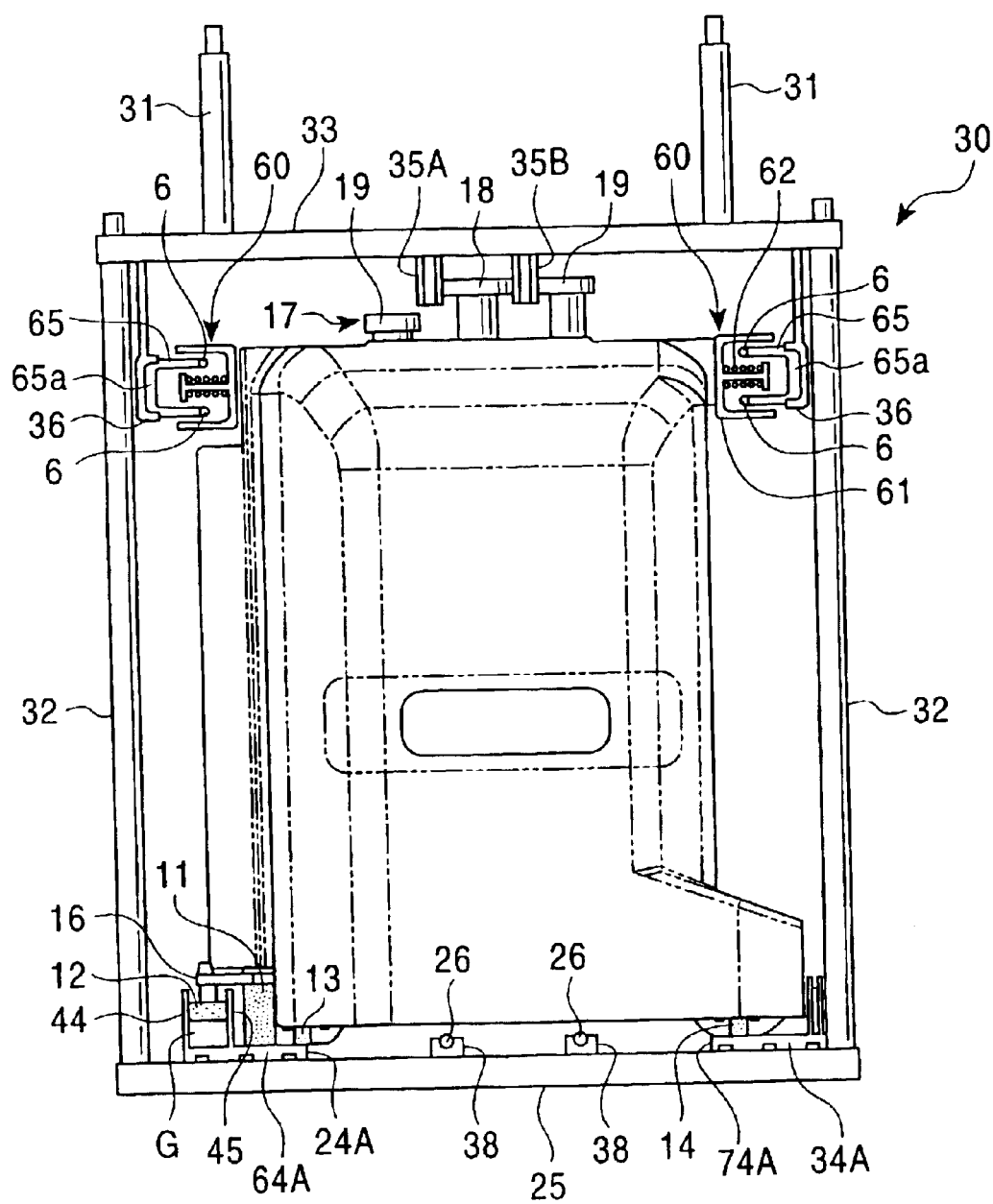
FIG. 5 is a front partly sectional view showing a running path and an automated guided vehicle.

As shown in FIGS. 4 and 5, the running path 2 is provided with the pair of rail members 24A, 34A, a connection member 25 that connects the rail members 24A, 34A together, and the suspending member 30 that suspends the connection member 25.

The rail members 24A, 34A are arranged so as to form a gap between them through which the article 9 can move in the vertical direction. As described later in detail, this arrangement is provided so as to transfer the article 9 from the vehicle 10 running on the running path 2, to an area located below the running path 2, via the gap between the rail members 24A, 34A.

The rail members 24A, 34A are members having a fixed length in the direction in which they are extended. The rail member 24A has an F-shaped cross section, while the rail member 34A has an L-shaped cross section. As described later in detail, compared to the rail member 34A, the rail member 24A is provided with a pair of guide rails 44, 45 along which the vehicle 10 is guided.

The running path 2 is formed by connecting the rail members 24A, 24A, ... together so that their longitudinally opposite ends are supported and fixed by the connection member 25 and connecting the rail members 34A, 34A, ... together so that their longitudinally opposite ends are supported and fixed by the connection member 25, to form a lateral pair of long rails. In the description below, the rail members 24, 34 collectively refer to the straight parts of the rail members 24A, 34A and the curved parts of the rail members 24B, 34B. If it is unnecessary to distinguish the straight parts from the curved parts, the term "rail members 24, 34" will be used.

The connection members 25 each connect the rail members 24, 34 together at their undersides and are disposed at specific intervals to support the rail members 24, 34.

Further, the opposite ends of the connection member 25 are supported by the suspending member 30, suspended from the ceiling of the clean room. A main body of the running path 2 composed of the rail members 24, 34 is supported by the ceiling. The suspending member 30 comprises suspending rods 31, 31 suspended directly from the ceiling surface, side rods 32, 32 extending perpendicularly from the respective ends of the connection member 25, and a bridging member 33 that connects the pair of rods 31, 32 together.

The connection member 25 is elongated and attached to the bottom surfaces of the rail members 24, 34 so that the direction in which it is bridged across the rail members 24, 34 corresponds to a longitudinal direction. Accordingly, a gap is formed between the connection members 25, 25 attached to the rail members 24, 34. The gap between the rail members 24, 34 is formed to have a width sufficient to allow the article 9 to pass through as described previously. This width is kept constant by the connection member 25. Further, the intervals at which the connection members 25 are provided along the running path 2 each have a width sufficient to allow the article 9 to pass through.

Figure 16:
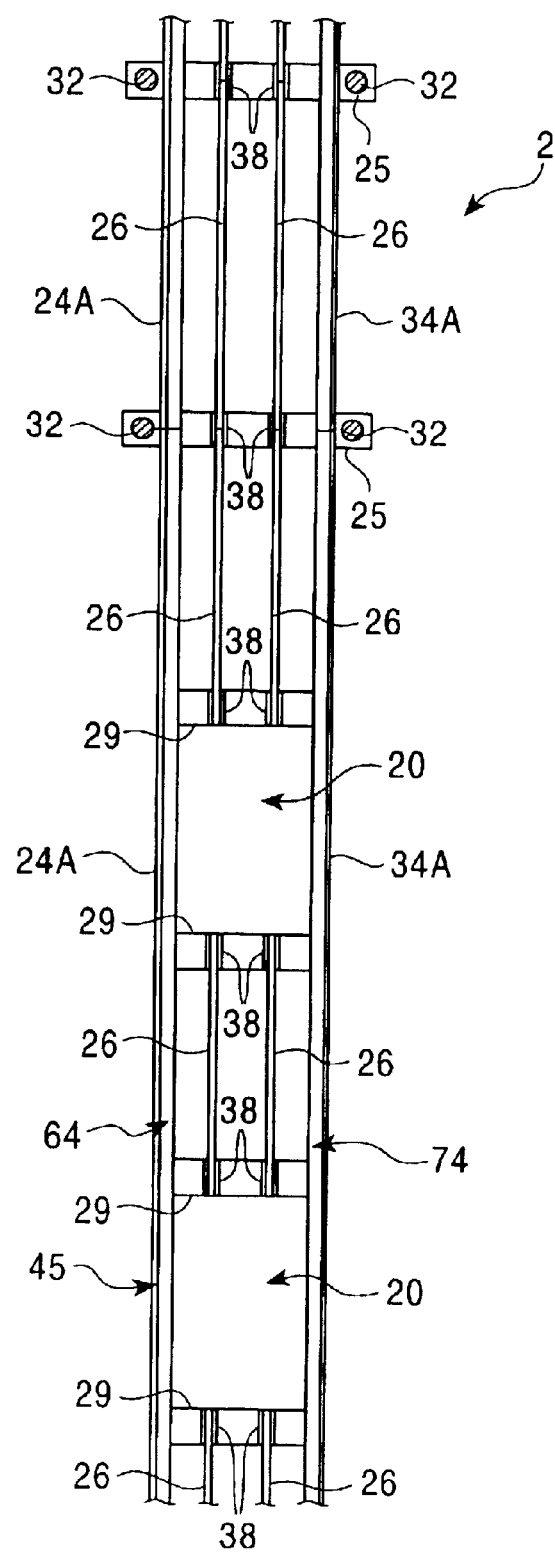
FIG. 16 is a partial plan view of a running path.

In the straight part of the running path 2, bar-like members 26, 26 are bridged across the connection members 25, 25 as shown in FIGS. 4, 5, and 16. Brackets 38 are fixed to the connection member 25 to grip the bar-like members 26, 26. The bar-like member 26 is fall preventing means for operating if the article 9 starts to fall, to prevent the article 9 from falling down to the floor surface. The bar-like members 26, 26 divide the gap formed by the pair of rails composed of the rail members 24A, 34A and the connection members 25, 25. The smaller gaps resulting from the division are each smaller than the article 9 so as to prevent the article 9 from falling down. In this regard, the bar-like members 26, 26 do not block an article passage opening 20.

With this simple configuration, the rail members 24A, 34A are suspended by the connection members 25, 25, ... suspended by the suspending members 30, 30, ... Further, the connection members 25, 25, ... reinforce the gap between the rail members 24A, 34A so that the gap will not be widened. Consequently, a drive wheel 11 or driven wheels 14, 14 of the vehicle 10, running on the running path 2, are surely prevented from falling down from the rail members 24A, 34A. This prevents the vehicle 10 from falling down. Therefore, safety is improved.

Further, the suspending members 30, 30, ... suspend the connection members 25, 25, ..., which reinforce the rail members 24A, 34A as described previously. This eliminates the need to provide separate hangers for suspending the rail members 24A, 34A. Therefore, costs can be reduced.

Figure 6:
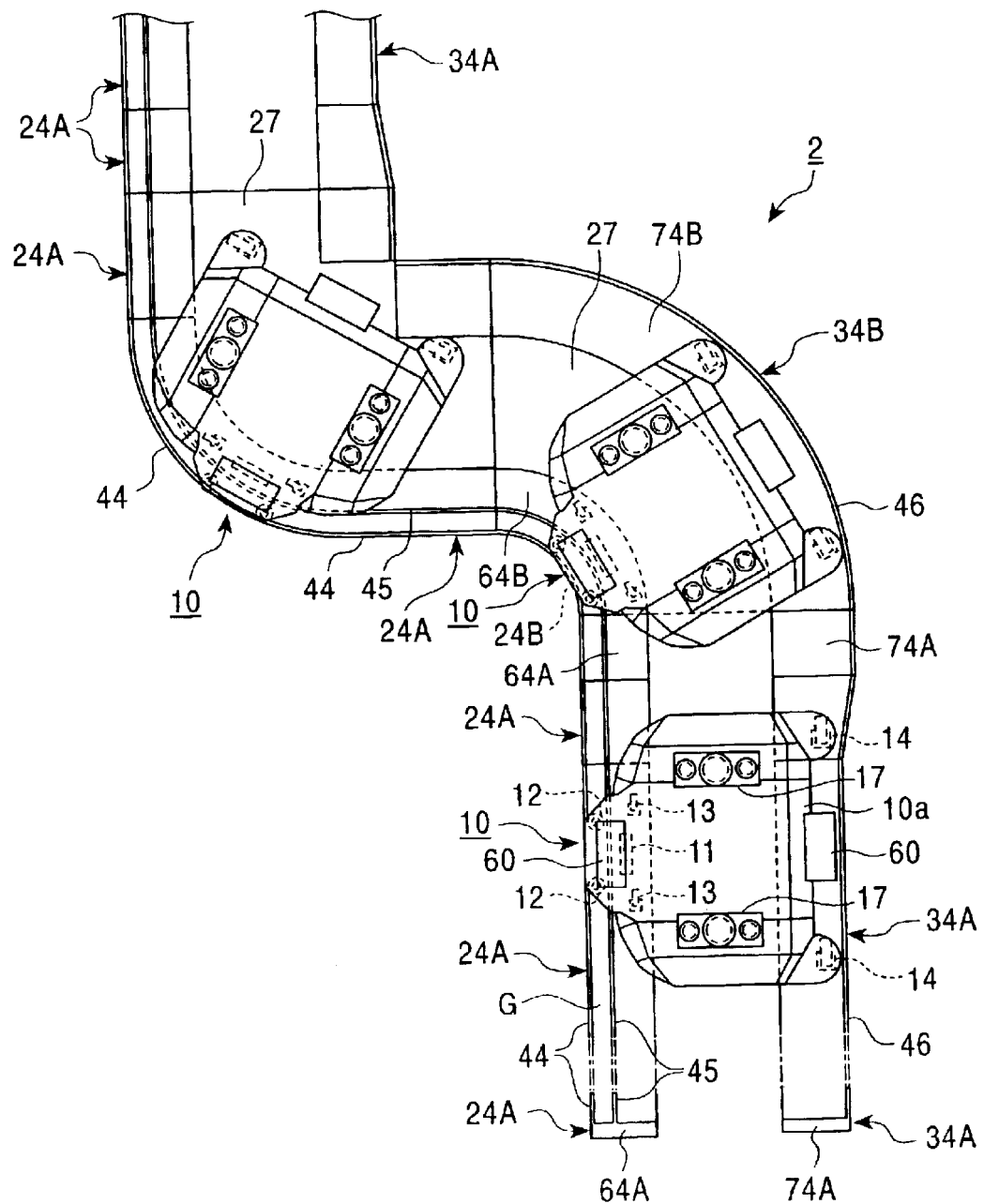
FIG. 6 is a plan view showing an automated guided vehicle running along a curved part of a running path.

In the curved part of the running path 2, a plate-like member 27 is provided between the pair of rails composed of the rail members 24B, 34B as shown in FIG. 6. The plate-like member 27 has a top surface formed at the same height as that of the top surfaces of the rail members 24B, 34B. The plate-like member 27 is mounted so as to block the area between the rail members 24B, 34B. When the plate member 27 is thus arranged between the rail members 24B, 34B, the driven wheels 14, 14 (described later), which are caster wheels capable of moving rotatively in a horizontal direction, can run even if it is derailed while running along the curved part. The curved part of the running path 2 in the present embodiment is formed of rail members 24B, 34B and the plate-like member 27. However, the curved part may be integrally formed of a single plate member. The plate-like member 27 is also fall preventing means for the article 9 like the bar-like member 26. Accordingly, the bar-like member 26 may also be used for the curved part. However, the use of the plate-like member 27 serves to avoid manufacturing bar-like members corresponding to the curved parts.

A configuration of the rail members 24A, 34A will be described. As shown in FIGS. 4 to 6, the rail member 24A comprises a running surface portion 64A against which the drive wheel 11 (described later) of the vehicle 10, and a pair of guide rails 44, 45 extending perpendicularly to the running surface portion 64A. The guide rails 44, 45 are provided at an outer end (with respect to the running path 2) of the running surface portion 64A. The guide rails 44, 45 are arranged so as to form a space between themselves which is slightly larger than the diameter of guide rollers 12 (described later) of the vehicle 10 so as to guide the guide rollers 12 inside.

In the description below, the running surface portion 64A of the rail member 24A and a running surface portion 64B of the rail member 24B are collectedly referred to as a "running surface portion 64".

As shown in FIGS. 4 to 6, the rail member 34A comprises a running surface portion 74A against which the driven wheel 14 (described later) of the vehicle 10, and a side wall 46 extending perpendicularly to the running surface portion 74A. The side wall 46 is provided at an outer end (with respect to the running path 2) of the running surface portion 74A. With this arrangement, the rail member 34A has an L-shaped cross section. In the description below, the running surface portion 74A of the rail member 34A and a running surface portion 74B of the rail member 34B are collectedly referred to as a "running surface portion 74". As shown in FIG. 5, rail members 24A, 34A each have an "L"-shaped cross section, and horizontal portions 64, 74 are arranged opposite each other. A guide groove G formed of a pair of guide rails 44, 45 is formed outside one 24A of the rail members. The guide rollers 12, 12 of the vehicle 10 are loosely inserted into the guide groove G.

The guide rails 44, 45 are provided only on the rail member 24. Accordingly, in the running path 2, the guide rails 44, 45 are not provided at both ends of the running path 2 but at only one end of it.

Figure 7:
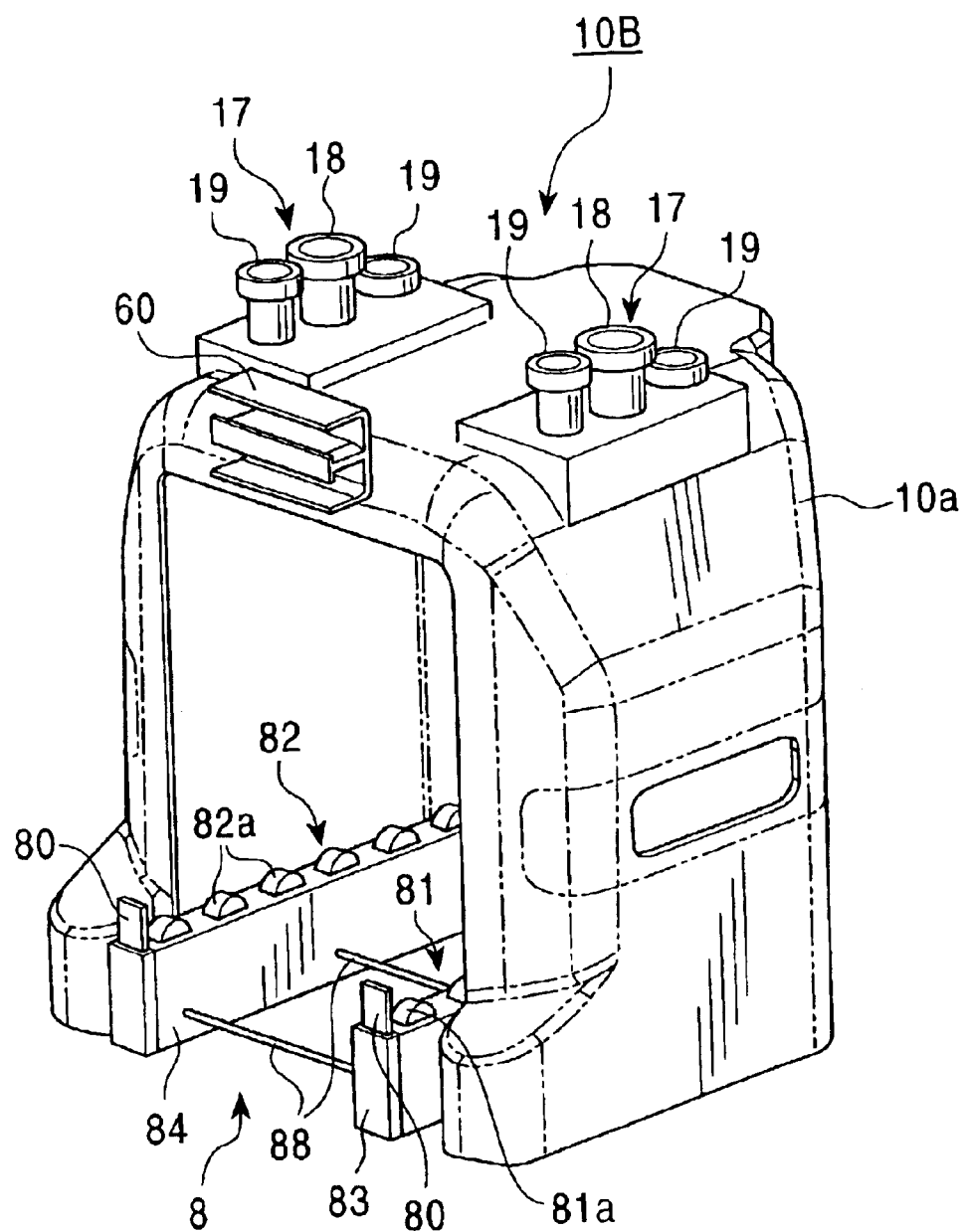
FIG. 7 is a perspective view showing a second automated guided vehicle.

With reference to FIGS. 4 to 7, description will be given of arrangements common to the first vehicle 10A and the second vehicle 10B. FIG. 7 is a perspective view showing the second vehicle 10B. The vehicles 10A, 10B each comprise a common body frame 10a. FIG. 4 shows the first vehicle 10A, whereas FIG. 7 shows the second vehicle 10B. The body frame 10a has openings formed in one of its right and left sides and in its bottom surface.

Figure 15:
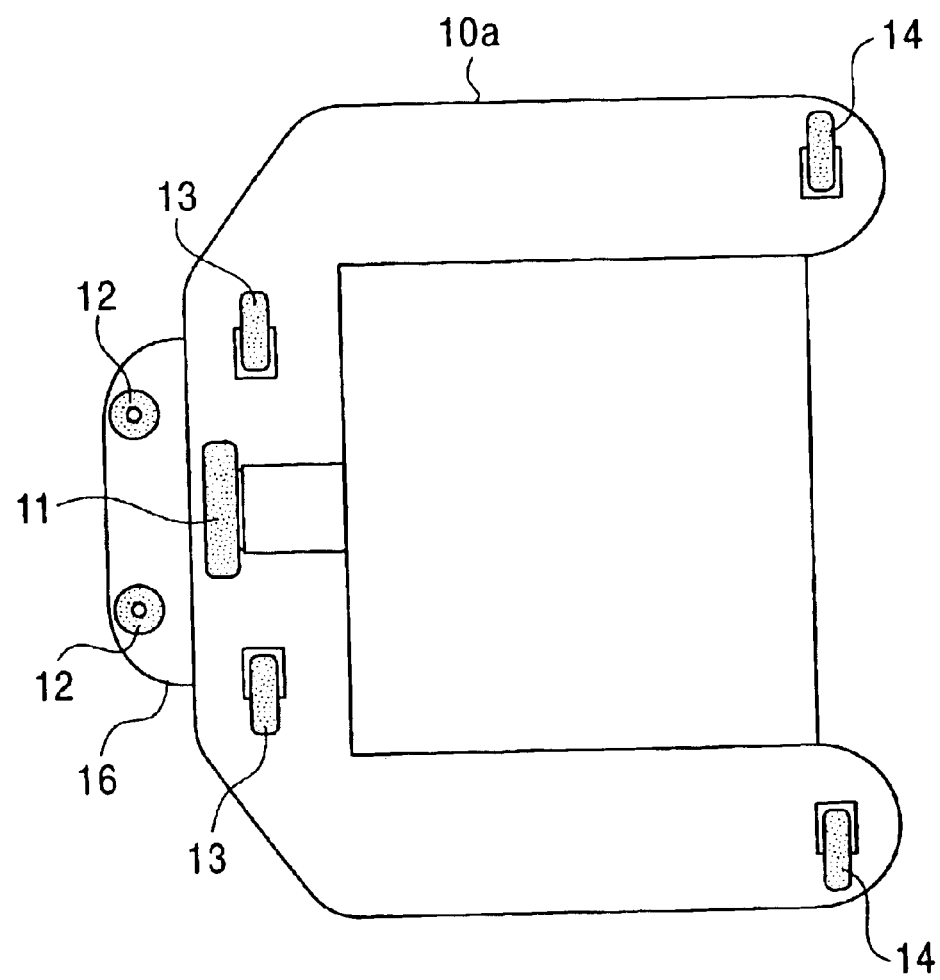
FIG. 15 is a bottom view of automated guided vehicles.

As shown in FIGS. 6 and 15, various wheels and the like are provided on the bottom surface of the vehicle 10 to allow the vehicle 10 to run. A bracket 16 projects from the bottom of that side of the body frame 10a which is opposite to the above side, and the pair of guide rollers 12, 12 are provided perpendicularly to the bracket 16. The guide rollers 12, 12 have axels extending in the vertical direction. They are disposed in the center of the vehicle body in its fore and aft direction and parallel with each other in the same direction.

Further, the drive wheel 11 is arranged on the above opposite side of the body frame 10a so that its axel extends in a lateral horizontal direction. In a plan view, the axel of the drive wheel 11 is provided on the same side on which the guide rollers 12, 12 are provided, and is arranged on a vertical bisector of a straight line joining the guide rollers 12, 12 together. A part of the drive wheel 11 projects downward from the bottom surface of the body frame 10a so as to run on the running portion 64 of the rail member 24, on which the guide rail members 24, 25 are provided.

A pair of auxiliary wheels 13, 13 are provided on the bottom surface of the body frame 10a at the front and rear of the drive wheel 11, respectively. The auxiliary wheels 13, 13 are composed of caster wheels that can change their own directions. The auxiliary wheels 13, 13 each have an axel extending in the lateral horizontal direction. The auxiliary wheels 13, 13 are typically arranged so as to form a small clearance (for example, about several millimeters) between them and the running portion 64 of the rail member 24A so as not to contact with the running portion 64. The auxiliary wheels 13, 13 are maintained above the running portion 64, while the drive wheel 11 permanently contacts with the running portion 64. When the body frame 10a is inclined, the auxiliary wheels 13, 13 come into contact with the running portion 64 to prevent further inclination.

Furthermore, a pair of driven wheels 14, 14 is provided at one side end of bottom surface of the body frame 10a so as to extend perpendicularly to the bottom surface. The driven wheels 14, 14 are composed of caster wheels that can change their own directions in a horizontal plane. They are arranged in the front and rear, respectively, of bottom surface of the body frame 10a. The driven wheels 14, 14 each have an axel extending in the lateral horizontal direction. The driven wheels 14, 14 are provided on that side of the vehicle which is opposite to the guide rollers 12, 12. The driven wheels 14, 14 run on the rail composed of the rail member 34.

The three points of the drive wheel 11 and driven wheels 14, 14 support the vehicle 10. Further, the fore and aft pair of guide rollers 12, 12 guides the vehicle 10 along the running path 2, while rotating in contact with one of the guide rails 44, 45.

Pickup units 60 are provided on the laterally opposite sides of the body frame 10a as a power source for the vehicle 10. Each of the pickup units 60 is provided with a core with an E-shaped cross section and a pickup coil wound around the core. An electromagnetic induction phenomenon is utilized to supply power to the pickup unit 60 through feeder lines 6, 6, respectively. The pickup units 60, 60 take up a large percentage of the weight of the vehicle body. The pickup units 60, 60 are thus arranged in the front and rear, respectively, of the vehicle body to maintain the balance of weight of the whole vehicle body to allow, for example, the vehicle 10 to run smoothly along the curved portion. Further, the running path 2 has diverging paths, so that the feeder lines 6, 6 are basically laid on one side of the running path 2 but on the other side of the running path 2 in particular areas such as diverging paths. Accordingly, by arranging the pickup units 60, 60 on the laterally opposite sides, respectively, of the body frame 10a, power can be supplied to the running vehicle 10 even on the diverging paths and the like without being instantaneously interrupted.

A core 61 made of ferrite and having a generally "E"-shaped cross section is fixed to each of the pickup units 60. The pickup coil 62 is wound around a portion projecting from the vertical center of the core 61. In the core 61, the feeder lines 6, 6, held at the tips of feeder line holders 65, 65, . . . , described later, are each arranged in a corresponding one of two concave spaces formed between an upper projecting portion and the central projecting portion and between the central projecting portion and a lower projecting portion, respectively. The pickup coil 62 receives magnetic fields generated by conducting a high frequency current through the feeder lines 6, 6. Then, an electromagnetic induction phenomenon is utilized to extract power from an induced current generated in the pickup unit 60. Thus, power is supplied to the pickup unit 60 through the feeder lines 6, 6 to drive a motor for the drive wheel 11. The power is also supplied to control equipment.

Further, the vehicles 10A, 10B are each provided with the same diverging devices 17, the configuration of which will be descried later.

Now, a description will be given of characteristic arrangements of the first vehicle 10A and arrangements for transferring the article 9 between the first vehicle 10A and the automatic warehouse 5. The second vehicle 10B comprises the transfer roller conveyor 8 as means for transferring the article 9 (it is also acts as means for housing the article). The transfer roller conveyor 8 has rows of rollers arranged parallel with each other along the carrying direction so as to form a space between the rows. The transfer roller conveyor 8 can support edges of bottom surface of the article 9. Further, the interior space of body frame 10a of the second vehicle 10B is formed to be large enough to place and house the article 9 on the transfer roller conveyor 8 mounted in the vehicle 10B.

The transfer roller conveyor 8 basically has the same configuration as that of each of the first storage and retrieval roller conveyors 54 and the second storage and retrieval roller conveyors 55, provided in the automatic warehouse 5. In addition to the transfer roller conveyor 8, the first storage and retrieval roller conveyor 54 is provided with side guides 75, 76 at its respective sides in the carrying direction to prevent the article 9 from falling down. Further, the first storage and retrieval roller conveyor 54 and the second storage and retrieval roller conveyor 55 differ only in their formation length in the carrying direction. That is, the roller conveyors 54, 55 differ in the distance the article 9 can be carried along them. Accordingly, in the description below, the description of the transfer roller conveyor 8 will be omitted by describing the first storage and retrieval roller conveyor 54.

The second storage and retrieval roller conveyor 55 will be described with reference to FIGS. 8 to 11. In the description of the first storage and retrieval roller conveyor 54, the carrying direction corresponds to the conveyor as viewed from its front or rear surface, whereas the lateral direction with respect to the carrying direction corresponds to the conveyor as viewed from its right or left side.

Figure 8:
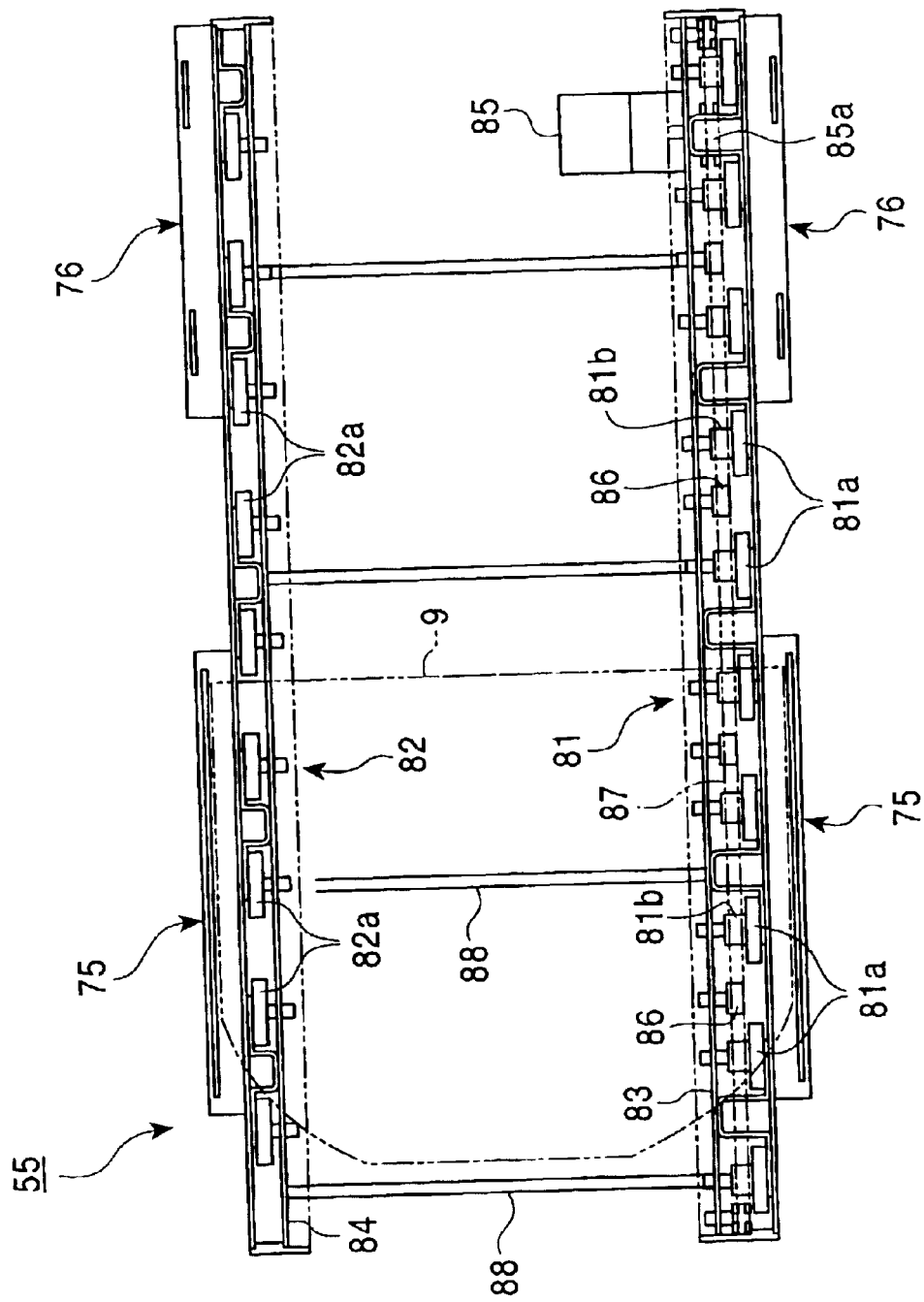
FIG. 8 is a plan view showing a second storage and retrieval roller conveyor.
Figure 10A:
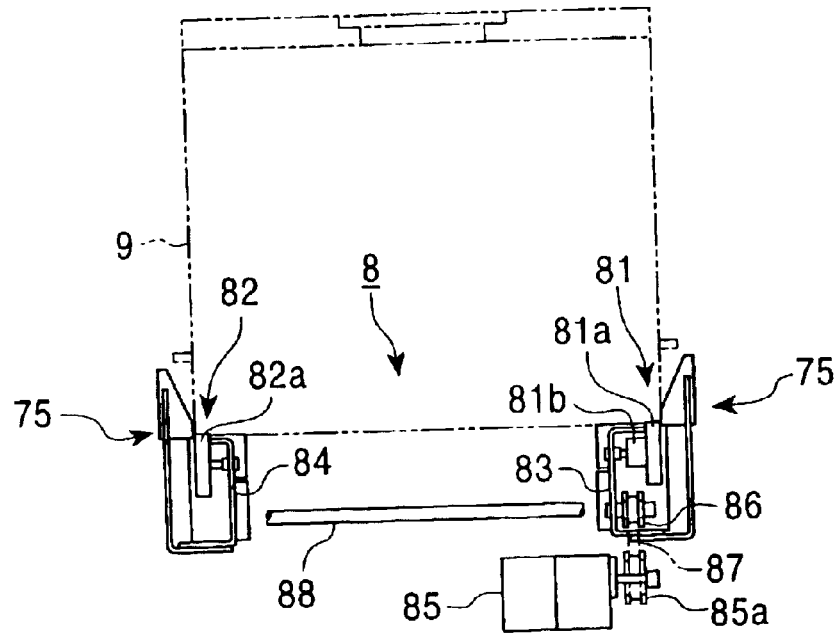
FIG. 10A is a front view of a whole second storage and retrieval roller conveyor and FIG. 10B is a front view showing an area in which an end of the article and a roller row abut against each other.

As shown in FIGS. 8, 9 and 10A, the first storage and retrieval roller conveyor 54 is provided with pairs of roller rows 81, 82 arranged parallel with each other along the direction in which the article 9 is carried. The roller rows 81, 82 are composed of rollers 81a, 81a, . . . and rollers 82a, 82a, . . . , respectively, provided along the carrying direction. Support frames 83, 84 are provided in the right and left, respectively, of the first storage and retrieval roller conveyor 54 in the carrying direction. A support shaft extends from each of the rollers 81a, 82a in the lateral direction with respect to the carrying direction. Each roller 81a is supported by the support frame 83. Each roller 82a is supported by the support frame 84.

A drive motor 85 is provided under one end of the support frame 30 in the carrying direction. A motor shaft of the drive motor 85 extends in the lateral direction with respect to the carrying direction as in the case with the rollers 81a, 82a. A drive pulley 85a is fixed to the tip of the motor shaft. The support frame 83 is provided with tension pulleys 86, 86, . . . supported in the lateral direction with respect to the carrying direction. Further, a pulley 81b is coaxially fixed to each roller 81a. A belt 87 is wound around the drive pulley 85a, each pulley 81b, and each tension pulley 86. With these arrangements, when the drive motor 85 effects driving, the rollers 81a constituting the roller row 81 are rotated. The roller row 82 is not provided with any drive means. Each roller 82a is driven to rotate in contact with the bottom surface of the article 9 being carried by the roller row 81.

The rollers 81a, 82a are each composed of resin and have a resin material fitted around its outer periphery. This prevents the slippery between the rollers 81a, 82a and the article 9, which abuts against the rollers 81a, 82a. Further, while the article 9 is being carried, the rollers 81a, 82 absorb and reduce vibration generated between the bottom surface of the article 9 and the rollers 81a, 82a.

Figure 10B:
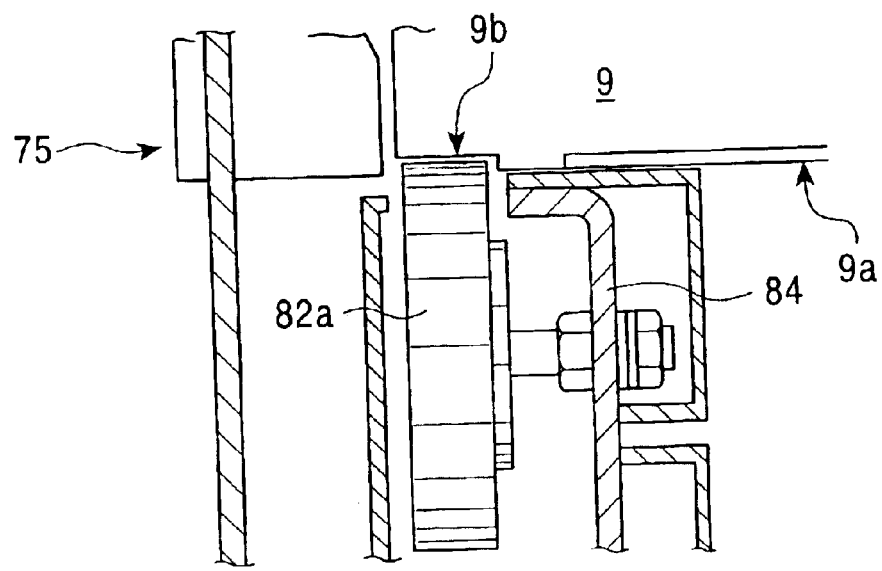
Figure 11:
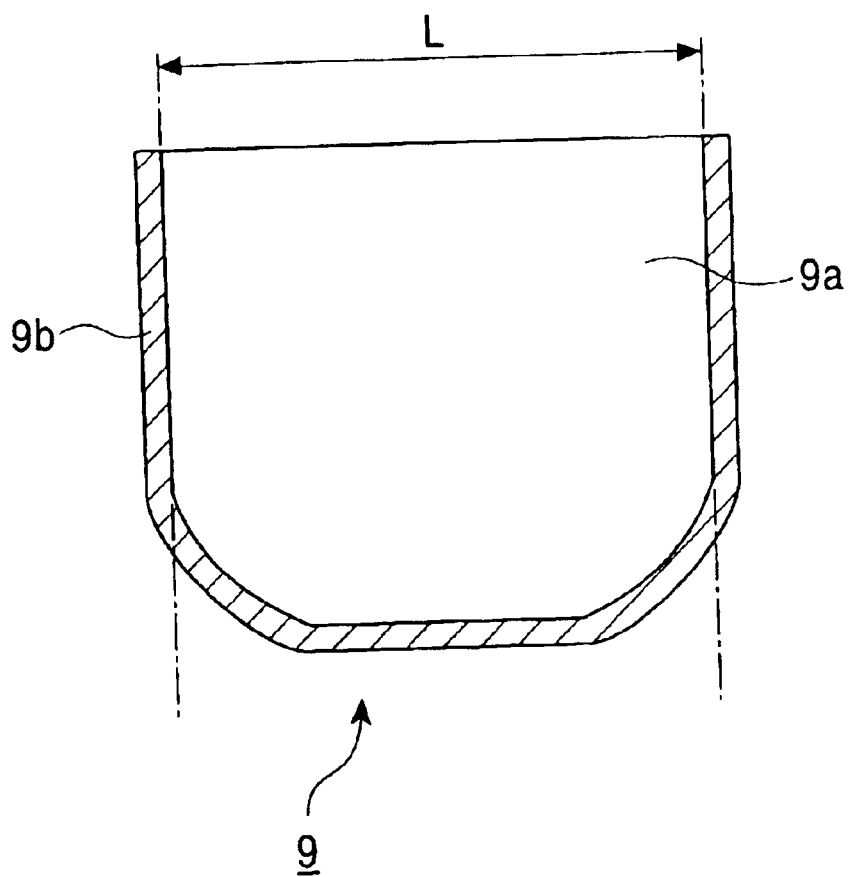
FIG. 11 is a bottom view of an article.

With reference to FIGS. 10A, 10B and 11, a description will be given of the shape of the bottom surface of the article 9 carried by the first storage and retrieval roller conveyor 54. On the bottom surface of the article 9, a positioning portion and the like are formed in a central portion 9a, with an edge portion 9b formed around the central portion 9a. The central portion 9a is formed with a positioning groove, not shown in the drawings, and a groove and a rib both used to identify the type of the article 9 or the like. That is, the central portion 9a has concaves and convexes. On the other hand, the edge portion 9b extends in the horizontal direction. That is, the bottom surface of the article 9 is formed so that only the edge portion 9b has a horizontal portion that is suitably supported and carried. The maximum width of central portion 9a of the bottom surface in the lateral direction is defined as L. With the previously described shape of the bottom surface of the article 9, to carry the article 9 using the first storage and retrieval roller conveyor 54, comprising the pair of roller rows 81, 82, the roller rows 81, 82 are disposed so as to form a clearance between them which is larger than the maximum width L.

Further, the rollers 81a, 82a, constituting the roller rows 81, 82, respectively, abut only against the horizontal portion 9b.

With these arrangements, even when the roller conveyors 8, 54, 55 are used to carry the article 9 having the bottom surface central portion 9a projecting downward, the central portion 9a does not contact with the roller rows 81, 82. If the bottom surface of the carried article 9 has concaves and convexes (downward projections or upward depressions) and if roller conveyors are configured so that their rollers may abut against the concaves or convexes, the article 9 may be vibrated owing to the abutment of the rollers against the concaves or convexes. With the roller conveyors 8, 54, 55, the article 9 is prevented from being vibrated even if it has concaves and convexes in the central portion of its bottom surface.

Further, the rollers 81a, 82a, constituting the roller rows 81, 82, respectively, are staggered in a plan view. As shown in FIG. 8, the rollers 81a, 82a are alternately arranged in the carrying direction. Specifically, none of the rollers 81a, 82a have an axis aligning with the axis of any of the rollers 81a, 82a in the lateral direction with respect to the carrying direction. Thus, one of the rollers 81a, 82a always supports one of the lateral ends of the bottom surface of the article in the carrying direction. If the rollers 81a and 82a are arranged so that each roller 81a and the corresponding roller 82a form a pair on the same axis, the ends of the bottom surface are repeatedly supported by the rollers 81a, 82a at one moment and then separated from them at the next moment. In this case, only a slight inclination of bottom surface of the article 9 may cause vibration when the ends of the bottom surface come into contact with the rollers 81a, 82a. The article 9 may thus rattle along during carriage. This problem is prevented by arranging the rollers 81a, 82a zigzag in a plan view.

The roller conveyors 8, 54, 55 are provided with bar-like members 88, 88, . . . that bridge across the support frames 83, 84. The bar-like members 88 integrally connect the support frames 83, 84 together but also function to prevent the article 9 from falling down from the roller conveyors 8, 54, 55. The bar-like members 88 prevent the article 9 from falling down from between the support frames 83, 84, arranged so as to form a space between them.

The roller conveyors 54, 55 are each provided with the side guides 75, 76 on its respective lateral sides with respect to the carrying direction to prevent the article 9 from falling down. As shown in FIG. 10A, the side guides 75, 76 are arranged so as to correspond to the respective lateral sides of bottom surface of the article 9. The pair of side guides 75, 76 are fixed to each of the support frames 83, 84, arranged on the respective lateral sides of the first storage and retrieval roller conveyor 54. The side guides 75, 76 prevent the article 9 from falling down from the side of the first storage and retrieval roller conveyor 54. For the transfer roller conveyor 8, mounted in the first vehicle 10A, most of the conveyor 8 in the direction in which it is formed is housed in the body frame 10a. Consequently, the body frame 10a functions as guide means for preventing the article 9 from falling down. Therefore, the transfer roller conveyor 8 is not provided with the side guides 75, 76.

As described later in detail, each of the roller conveyors 8, 54, 55 in the present embodiment is provided with stoppers as fall preventing means for preventing the article 9 from falling down from its free end. The roller conveyor 8 is provided with stoppers 80 at its free end. The roller conveyor 55 is provided with stoppers 77 at its free end. The roller conveyor 54 is provided with fixed stoppers, not shown in the drawings, at its free end. The stoppers 88, 77 can be freely moved in the vertical direction by a drive device, not shown in the drawings. The stoppers 88, 77 project upward from carrying surfaces of the roller conveyors 8, 55, respectively, to engage with the article 9 to prevent it from falling down from the free ends of the roller conveyors 8, 55, respectively. When the article 9 is carried between the roller conveyors 8, 55, the stoppers 88, 77 lower from the carrying surface to allow the article 9 to pass along the carrying surface.

The roller conveyors 8, 55 have similar basic configurations as described previously. Accordingly, when the roller conveyors 8, 88 are arranged in proximity to each other along the carrying direction, the article 9 can be continuously carried between the roller conveyors 8, 55. As described previously, the transfer roller conveyor 8 is provided in the first vehicle 10A, running on the running path 2. The first storage and retrieval roller conveyor 54 is provided in the automatic warehouse 5.

As shown in FIGS. 2 and 3, in the warehouse 5, the second storage and retrieval roller conveyor 55 projects toward the inter-process carrying path 22 (a part of the running path 2), and its front end sticks into the inter-process carrying path 22. The direction in which the second storage and retrieval roller conveyor 55 projects is perpendicular to the direction in which the inter-process carrying path 22 is formed. On the other hand, the second vehicle 10B is provided with the transfer roller conveyor 8, which extends perpendicularly to the running direction. The direction in which the second vehicle 10B runs is perpendicular to the direction in which the inter-process carrying path 22 (a part of the running path 2) is formed. Further, the height position of the transfer roller conveyor 8 is equal to that of the second storage and retrieval roller conveyor 55. The running path 2 as a whole is formed in the same horizontal plane. Then, when the second vehicle 10B is immediately laterally adjacent to the second storage and retrieval roller conveyor 55, the transfer roller conveyor 8 and the second storage and retrieval roller conveyor 55 are in series in the carrying direction and in proximity to each other. When the roller conveyors 8, 55 are closest to each other (the previously described proximity condition), the separation between the front ends of these conveyors is about several centimeters.

As described above, by selecting the proper layout of the second vehicle 10B, the running path 2, and the automatic warehouse 5, the transfer roller conveyor 8 and the second storage and retrieval roller conveyor 55 are located in series in the carrying direction and in proximity to each other.

Thus, the article can be delivered between the second vehicle 10B and the automatic warehouse 5 provided that one of the roller conveyors 8, 55 dispatches the article 9, while the other pulls the article 9 into itself. Further, the carriage of the article 9 by one of roller conveyors 8, 54 has only to be drivingly controlled so that this conveyor continues carrying the article 9 until it reaches the other roller conveyor. This control is easier than control executed using, for example, articulated transfer means.

Further, the roller conveyors 8, 55 are provided with the stoppers 80, 77, respectively, at their projecting ends. The stoppers 80, 77 are plate-like members that can be moved in the vertical direction. Each of the stoppers 80, 77 has a stop position at which it projects upward from the carrying surface of the conveyor and a standby position at which it retreats downward from the carrying surface. When the roller conveyors 8, 55 are in proximity to each other, the stoppers 80, 77 are at their standby positions. Thus, the article 9 can be carried along the carrying diction of both roller conveyors 8, 55. When the roller conveyors 8, 55 are separated from each other (non-proximity condition), the stoppers 80, 77 are at their stop positions. Thus, the carrying path is blocked at the tip position of each of the roller conveyors 8, 55 in the carrying direction. This prevents the article 9 from falling down from the roller conveyors 8, 55. The first storage and retrieval roller conveyor 54 is provided with fixed stoppers that always block the carrying path at the projecting tip of the conveyor. As described later in detail, the first storage and retrieval roller conveyor 54 need not open its tip position in the carrying direction.

Now, a description will be given of characteristic arrangements of the first vehicle 10A and arrangements for transferring the article 9 between the first vehicle 10A and the automatic warehouse 5. The running path 2 is provided with article placement areas for the previously described processing devices 4 and automatic warehouses 5 below the running path 2 so that the running path 2 is superimposed on the article placement areas in a plan view. As shown in FIG. 2, an article placement table 41 is provided at the intra-process carrying path 21 side of the processing device 4 as its article placement area. Further, stations 51, 52 are provided at the respective sides of each automatic warehouse 5, i.e. at its intra-process carrying path 21 side and inter-process carrying path 22 side, respectively, as the article placement areas for the automatic warehouse 5. The stations 51, 52 are each provided with the first storage and retrieval roller conveyor 54. The first storage and retrieval roller conveyor 54 and the second storage and retrieval roller conveyor 55 lie one on top of the other in a plan view (as shown in FIG. 2). The first storage and retrieval roller conveyor 54 is located below the second storage and retrieval roller conveyor 55 (as shown in FIG. 3).

The first vehicle 10A comprises the hoist 7 and moves through the running path 2 in the vertical direction to and from the article placement area (article placement table 41 or first storage and retrieval roller conveyor 54) located below the running path 2, to transfer the article 9. Thus, the running path 2 is formed with the passage opening 20 (shown in FIGS. 12 and 13 which is located above the article placement area and through which the article 9 can be passed.

The passage opening 20 will be described with reference to FIGS. 12 and 13.

Figure 12:
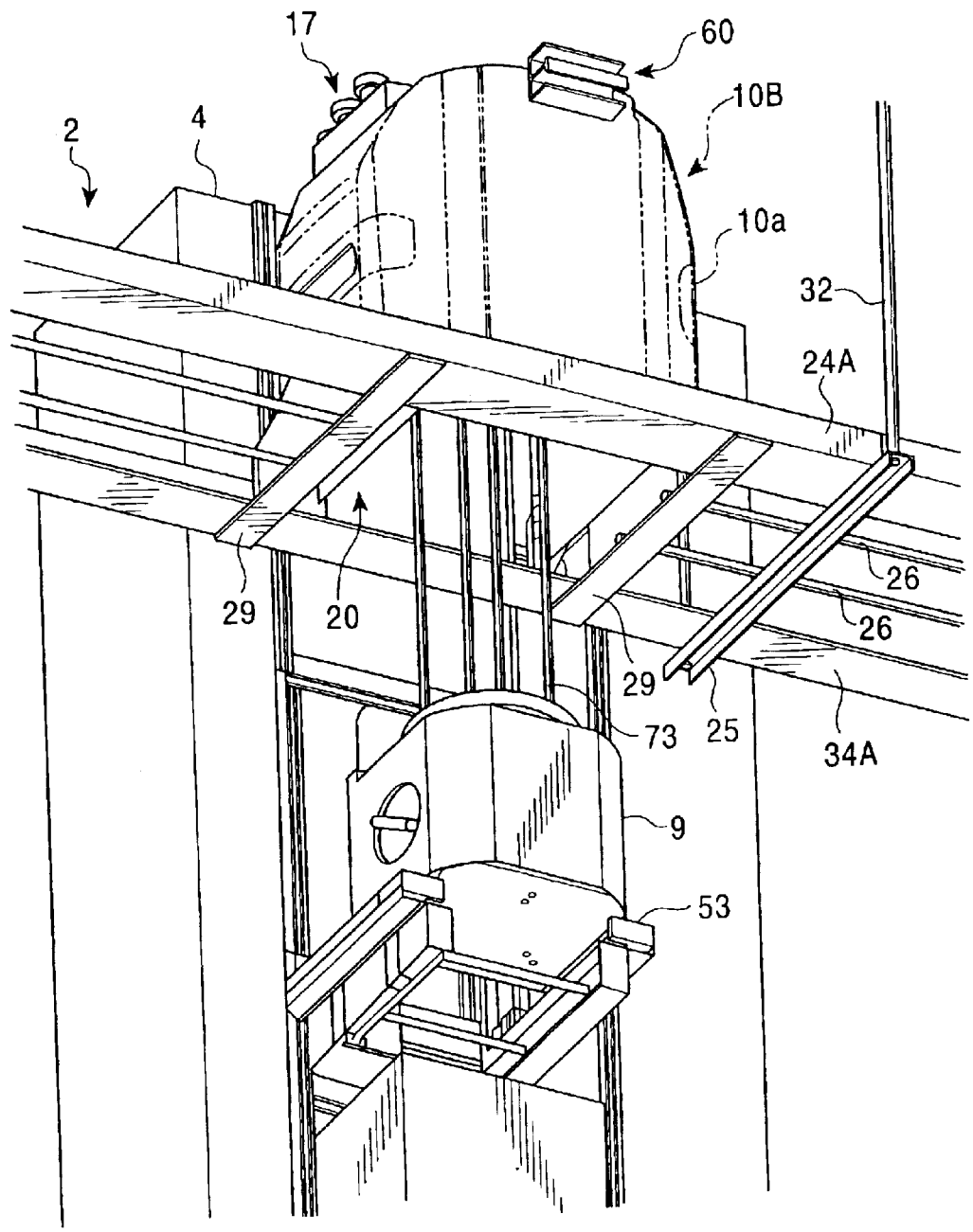
FIG. 12 is a perspective view showing how a first automated guided vehicle is used to pass an article through a passage opening.
Figure 13:
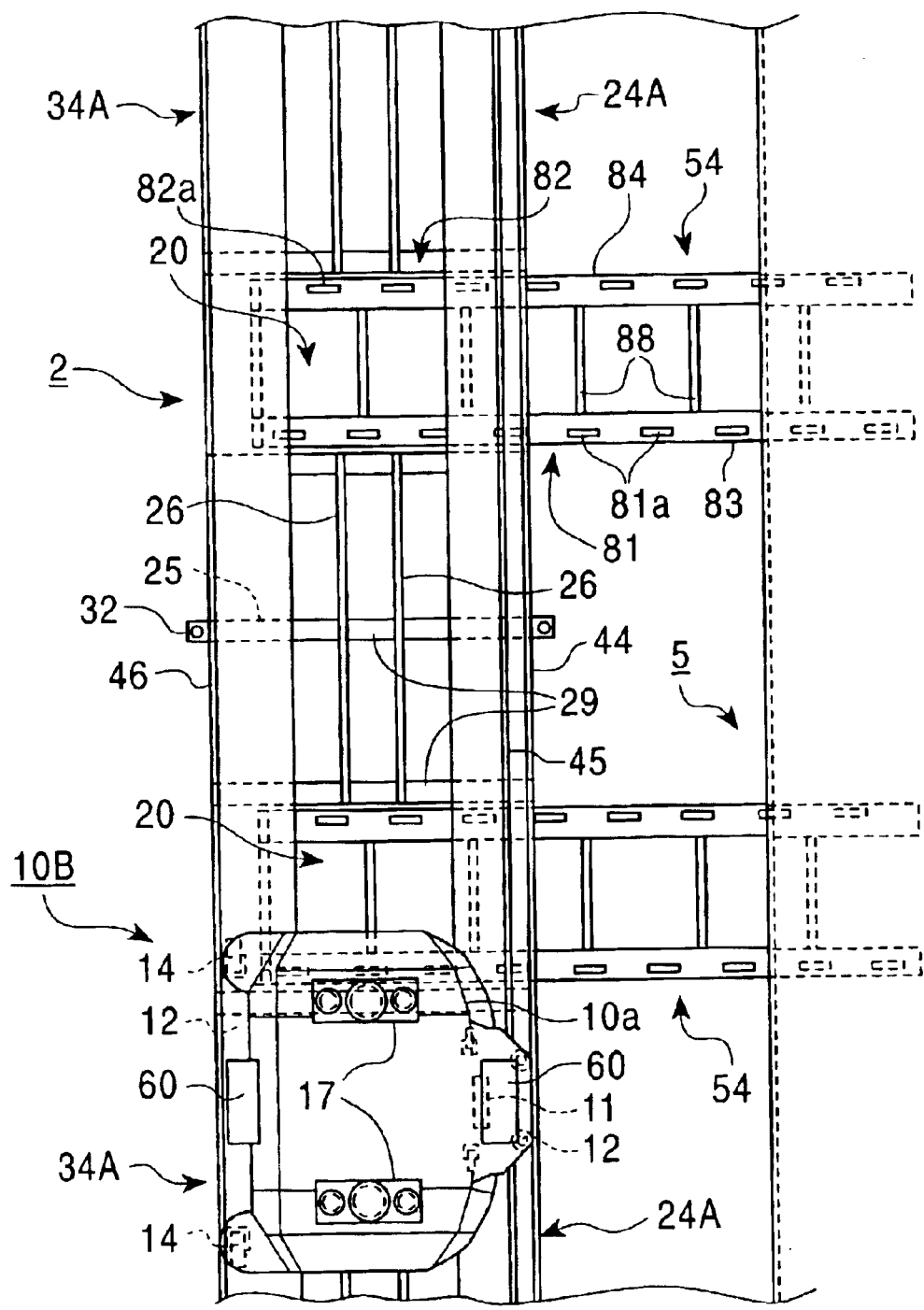
FIG. 13 is a plan view showing a layout of an passage opening and a first storage and retrieval roller conveyor.

As shown in FIG. 12, the passage opening 20 is formed so as to be surrounded by the pair of rails composed of the rail members 24, 34 and connection members 29, 29 bridged across the pair of rails. In contrast with the connection members 25, the connection members 29 are not supported by the suspending member 30. Further, the fall preventing members 26, 26 are not arranged between the connection members 29, 29 because the passage opening 20 is formed between them. However, the fall preventing members 26, 26 are bridged across the connection members 25, 29. The connection member 29 differs from the connection member 25 in that the former is not supported by the suspending member 30. The passage opening 20 may be formed using the connection members 25 in place of the connection members 29.

As shown in FIG. 4, the hoist 7 is provided in the body frame 10a as means for transferring the article 9. The hoist 7 comprises a hoist main body 70 and an elevating and lowering section 71 suspended from the hoist main body 70 using a belt. The hoist main body 70 comprises a moving device (not shown in the drawings) installed in its upper part and a drive section used to elevate and lower the elevating and lowering section 71. The moving device is used to precisely place the article 9 on the article placement area (article placement table 41). The moving device moves the hoist 7 in a lateral direction with respect to (orthogonal to) an advancing direction. Further, the elevating and lowering section 71 grips a flange portion (not shown in the drawings) formed at the top of the article 9. The elevating and lowering section 71 is elevated and lowered by the hoist 7. The interior space of the body frame 10a is formed to be large enough to house the hoist 7 and the article 9 gripped by the hoist 7. After the article 9 has been housed in the body frame 10a, it is located inside the body frame 10a. In this condition, the second vehicle 10B carries the article 9.

In this configuration, the first vehicle 10A is provided with the hoist 7, an elevating and lowering device, so as to transfer the article 9 via the passage opening 20 (by passing through the passage opening 20 in the vertical direction), formed in the running path 2. Further, the first storage and retrieval roller conveyor 54 is arranged in the automatic warehouse 5 so as to project to below the passage opening 20 in the intra-process carrying path 21 (a part of the running path 2). As shown in FIG. 13, the passage opening 20 is superimposed on the first storage and retrieval roller conveyor 54 in a plan view. Then, when the first vehicle 10A is above the passage opening 20, the article 9 can be transferred between the first vehicle 10A and the first storage and retrieval roller conveyor 54 via the passage opening 20.

Thus, the article 9 can be transferred even between the elevating and lowering device (hoist 7) and the automatic warehouse 5 without transfer operations such as striding of the running path 2. Further, as shown in FIG. 2, the first vehicle 10A can transfer the article 9 not only to the automatic warehouse 5 but also to the processing device 4. The processing device 4 is provided with the stations 41, 41 at its loading and unloading ports as placement areas for the article 9. The stations 41, 41 are arranged below the first closed loop path 21 so as to project from the processing device 4. The processing device 4 arranged outside the first closed loop path 21 comprises a transfer device to transfer the article 9 between each station 41 and the interior of the processing device 4. The first closed loop path 21, located above the stations 41, 41, is formed with the passage openings 20, 20, through which the article 9 can be passed in the vertical direction.

Figure 14:
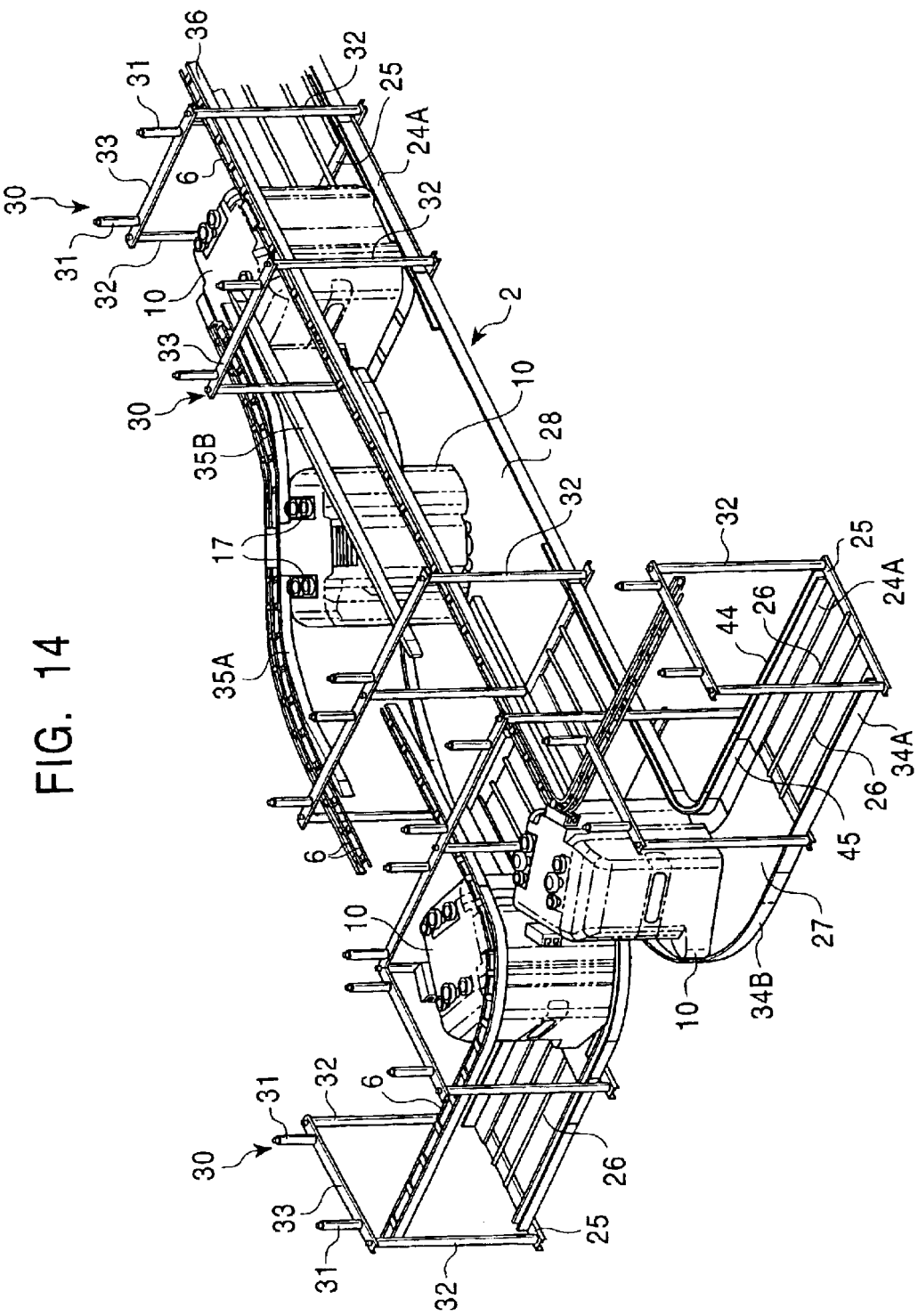
FIG. 14 is a perspective view showing a first automated guided vehicle running along a diverging or joining part of a running path.

Now, with reference to FIGS. 4, 5 and 14, a description will be given of a diverging or joining portion of the running path 2. The running path 2 may be formed with a diverging portion in which the running path diverges into two paths or a joining portion in which two paths join together. In such a case, as shown in FIG. 14, the running path 2 is provided with a crossover member 28 that is exclusively used for the diverging or joining portion. The entire top surface of-the crossover member 28 is formed as a running surface against which the wheels of the vehicle 10 abut. The position of top surface of the crossover member 28 coincides with the positions of the top surfaces of the running surfaces 64, 74 of the rail members 24, 34, respectively. Side walls 47, 47, ... extend vertically from the opposite ends of that part of the path which is formed into the crossover member 28.

No guide means for the vehicle 10 such as the guide rails 44, 45 are not provided in the crossover member 28 in the diverging or joining portion, which corresponds to the rail members 24, 34 in the straight and curved portions. In the diverging or joining portion, diverging guide rails 35A, 35B are provided between the bridging members 33, 33 of the suspending member 30 as guide means for the vehicle 10. The diverging guide rails 35A, 35B are provided for two paths into which the running path diverges in the diverging potion or which join together in the joining portion.

Now, a description will be given of the diverging device 17, provided in the vehicle 10. The vehicle 10 is provided with the diverging devices 17, 17 as guide means for the vehicle 10 corresponding to the diverging guide rails 35A and 35B. The diverging devices 17 are provided in the front and rear, respectively, of the vehicle 10 so as to stably guide the vehicle 10 along the diverging guide rails 35A, 35B without any guide rollers 12, 12. Furthermore, the diverging devices 17 can guide the vehicle 10 even if it must be retreated.

Each of the diverging devices 17 comprises three rollers projecting upward from the body frame 1a. The three rollers include a central guide roller 18 and diverging rollers 19, 19 provided at the laterally opposite sides of the guide roller 18. Axels supporting these three rollers each extend in the vertical direction. Further, the vertical position of the guide roller 18 is fixed, whereas the diverging rollers 19, 19 can be selectively brought into a projecting position or a housing position. When the diverging roller 19 is in its projecting position, it and the guide roller are at the same height.

Each of the diverging guide rails 35A, 35B has laterally opposite sides against which the guide roller 18 and the diverging roller 19 abut. The height position of the diverging guide rails 35A, 35B is the same as that of the diverging roller 19 and guide roller, 18 in their projecting positions. As shown in FIG. 4, the diverging guide rails 35A, 35B can be sandwiched between the diverging roller 19 and the guide roller 18 in their projecting positions. When the diverging guide rails 35A, 35B is sandwiched between the diverging roller 19 and the guide roller 18 in their projecting positions, the vehicle 10 has selected the corresponding diverging path. With these arrangements, when the vehicle 10 advances toward a diverging portion, the diverging devices 17, 17 and the diverging guide rails 35A, 35b enables a diverging path to be selected.

Further, after the diverging path has been selected, the vehicle 10 is guided along the running path 2. Furthermore, when the vehicle 10 advances toward a joining portion, it is unnecessary to select a branching portion. Instead, the vehicle 10 is guided along the running path 2 by the diverging devices 17, 17 and the diverging guide rails 35A, 35B.

More specifically, in a diverging or joining portion, the crossover member 28 functions as a running surface by discontinuing one of the rail members 24A, 34A between the start and end points of the diverging or joining portion to block the area between the rail members 24A, 34A all over the diverging or joining portion without causing certain parts of the rail members 24A, 34A to cross other parts of the rail members 24A, 34A. The top surface of the crossover member 28 is formed to extend in the horizontal direction and is arranged at the same height position as that of top surface of the running portion 64 of the rail member 24A.

With this arrangement, the guide groove G in the rail member 24 does not guide the vehicle 10 between the start and end points of the diverging or joining portion. Instead, the guide rails 35A, 35B, described later, guide the vehicle 10.

Once the diverging devices 17, 17 are activated in front of the start point of the diverging portion to start guiding the vehicle 10 in the advancing direction along the guide rail 35A (35B), the rail member 24, along which the vehicle 10 has been running, is discontinued. As a result, the combination of the guide rollers 12, 12 and the guide groove G no longer guides the vehicle 10.

However, between the start and end points of the diverging portion, the top of the vehicle 10 is guided by the guide rail 35A (35B) to run smoothly on the top surface of the crossover member 28, which blocks the area between the rail members 24A, 34A in the diverging portion. At this time, the top surface of the crossover member 28 reliably supports the drive wheel 11 and driven wheels 14, 14 of the vehicle 10. When turning, the vehicle 10 is driven by the drive wheel 11 while being guided by the guide rail 35A (35B). However, since the driven wheels 14, 14 are caster wheels, the vehicle 10 can freely change its direction. The driven wheels 14, 14 follow the advancement of the vehicle 10 along the guide rail 35A (35B) to allow the vehicle 10 to turn smoothly along the guide rail 35A (35B). Since one of the rail members 24A, 34A which is discontinued in the diverging portion is reinstalled at the end point of the diverging portion, the guide rollers 12, 12 are loosely reinserted into the guide groove in the rail materia 24. The guide rail 35A (35B) is adapted to guide the vehicle 10 until the guide rollers 12, 12 are loosely inserted into the guide groove G. Thus, the vehicle 10 is temporarily guided by both guide rail 35A (35B) and guide groove G. Subsequently, the guide rail 35A (35B) no longer guides the vehicle 10, which is thus guided by the guide groove G.

With these arrangements, the crossover member 28 acts as a running surface before the vehicle 10 completely transfers from one path to another through the area where the rail members 24A, 34A is discontinued. The crossover member 28 also serves to prevent the vehicle 10 from being derailed in a diverging or joining portion of the running path or falling from this portion.

The guide rails 35A, 35B are installed along the running path for the vehicle 10 in a diverging or joining portion. The guide rails 35A, 35B are suspended from a laterally central portion of the bridging member 33, constituting a suspending member 30. The guide rails 35A, 35B are installed between the plurality of bridging members 33, 33, . . . along the running direction. The two guide rails 35A and the two guide rails 35B are installed so as to extend from one path, which has not been diverged (or has been created by juncture), to two paths, which has been created by the divergence (or has not been joined together). On the path which has not been diverged (or has been created by juncture), the ends of the two guide rails 35A, 35B are disposed parallel with each other. The guide rail 35A (35B) is sandwiched between the guide rollers 18, 19 of the diverging device 17 of the vehicle 10.

When the vehicle 10 approaches a diverging portion, the diverging device 17 is activated at the start point of the diverging portion to elevate one of the diverging rollers 19. Then, one guided rail 35A (35B) of the guide rails 35A, 35B is sandwiched between this diverging roller 19 and the guide roller 18. Thus, the vehicle 10 is guided by this guide rail 35A (35B). Subsequently, one of the rail members 24A, 34A, arranged below the vehicle 10, is discontinued, so that the vehicle 10 is no longer guided by the guide rollers 12, 12 or the guide groove G. However, the vehicle 10 runs on the top surface of the crossover member 28 while having its top guided by the guide rail 35A (35B). Since one of the rail members 24A, 34A which is discontinued in the diverging portion is reinstalled at the end point of the diverging portion, the guide rollers 12, 12 are reengaged with the guide groove G in the rail member 24A. The vehicle 10, which has been guided by the guide rail 35A (35B), is then guided by the guide groove G.

Likewise, when the vehicle 10 approaches a joining portion, the diverging devices 17, 17 are activated at the start point of the joining portion to elevate one of the diverging rollers 19. Then, the guide rail 35A (35B) at the start point of the joining portion is sandwiched between this diverging roller 19 and the guide roller 18. Thus, the vehicle 10 passes through the joining portion while being guided by this guide rail 35A (35B).

The relationship between the guide rail 35A (35B) and the guide groove G, which guide the vehicle 10, is similar to that in the case of the diverging portion. This relationship is thus obvious and will thus be omitted.

As shown in FIG. 14, an attaching member 36 is supportably fixed to at least one of the lateral sides of the bridging member 33 of the previously described suspending member 30. As shown in FIGS. 4 and 5, the attaching member 36 is an elongated member the sides of which are open. An attaching groove 36b is formed inside the attaching member 36 so that a large number of feeder line holders 65, 65, . . . are fitted into the attaching groove 36b at predetermined intervals.

An attaching member the bottom surface of which is open may be attached to the bridging member 33, and the feeder line holders may be suspended from the attaching member. Thus, the suspending member 30 comprises the pair of the suspending rods 31, 31 suspended from the ceiling, the bridging member 33, the pair of side rods 32, 32 suspended from the bridging member 33, and the connection member 25, supported by the pair of side rods 32, 32. The feeder line holders 65 (attaching members 36) and the guide rail 35 are attached to the bridging member 33. The rail members 24A, 34A and the fall preventing member 26 are attached to the connection member 25. The side rods 32, 32 are removable from the bridging member 33. Then, by removing the side rods 32, 32 from the bridging member 33, the rail members 24A, 34A, the fall preventing member 26, and the suspending member 30 can be partly removed while keeping the feeder lines 6, 6, the guide rail 35, and others intact, which are difficult to partly remove. As a result, a space can be formed below the bridging member 33. Therefore, it is possible to transfer, for example, a high processing device that is otherwise obstructed by the rail members 24A, 34A and thus cannot be transferred.

The feeder line holder 65 is a block-like member the sides of which is open. The feeder line holder 65 has an upper and lower projecting portions holding the feeder lines 6, 6 at their tips. A convex portion 65a projecting outward is formed in a vertical portion of the feeder line holder 65 that joins the upper and lower projecting portions together. The feeder line holder 65 is attached to the attaching member 36 by fitting the convex portion 65a into the attaching groove 36b.

With these arrangements, the feeder lines 6, 6 are held by the large number of feeder line holders 65, 65, . . . and installed along the running path 2.

A description has been given of an embodiment of the automated guided vehicle system 1 according to the present invention. In another embodiment, the hoist 7 and the traversing device 70 are not mounted on the first vehicle 10A. Further, a lifter with a mast is provided in each of the article placement areas including the station 41 for the processing device 4 and the stations 51, 52 for the automatic warehouse 5. Then, the article 9 is delivered between the vehicle 10 and the article placement area of the station via the lifter.

In this embodiment, the first vehicle 10A running along the first closed loop path 21 or the second closed loop path 22 is stopped above the station 41 for the target processing device 4 (or the stations 51, 52 for the automatic warehouse 5). Then, the lifter scoops up the article 8 placed on the station 41 (or the stations 51, 52) and is then lifted. The article 9 is thus housed in an article housing space 10b through the passage opening 20, formed between the rail members 24A, 34A, located under the first vehicle 10A. The article 9 is held by a holding mechanism provided in the first vehicle 10A. In this condition, the first vehicle 10A is run and then stopped above the target station 51 (or the stations 51, 52). The first vehicle 10A then releases the article 9 and places it on the lifter elevated from the station 41 (or the stations 51, 52). The lifter is then lowered and passed through the passage opening 20. Finally, the lifter places the article 9 on the target station 41 (or the stations 51, 52).

As set forth in claim 1, there is provided an automated guided vehicle system comprising a running path suspended from a ceiling, article storages arranged along the running path, and an automated guided vehicle running along the running path, wherein the vehicle is provided with a transfer conveyor and each of the article storages is provided with a storage and retrieval conveyor and wherein the transfer conveyor and the storage and retrieval conveyor are arranged so as to approach each other so that an article can be transferred between the vehicle and the article storage. Consequently, the article can be delivered between the vehicle and the automatic warehouse provided that one of the roller conveyors dispatches the article, while the other pulls the article into itself. Further, the carriage of the article by one of roller conveyors has only to be drivingly controlled so that this conveyor continues carrying the article until it reaches the other roller conveyor. This control is easier than control executed using, for example, articulated transfer means.

As set forth in claim 2, a bottom surface of the article is formed to be planar at its laterally opposite ends in a carrying direction and the transfer conveyor and the storage and retrieval conveyor each have a pair of conveyor rows juxtaposed along the carrying direction so that the opposite ends of the bottom surface of the article can be supported by the pair of juxtaposed conveyor rows. Therefore, the article is prevented from being vibrated even if it has concaves and convexes in the central portion of its bottom surface.

As set forth in claim 3, there is provided an automated guided vehicle system comprising a running path including a plurality of first closed loop paths below each of which an article placement area is provided and a second closed loop path arranged along the corresponding first closed loop path, a first automated guided vehicle that runs along the first closed loop paths and that is provided with an elevating and lowering device to elevate or lower the article for transfer, and a second automated guided vehicle that runs along the second closed loop path and that includes a transfer conveyor, and wherein article storages are each arranged at a position where the article can be delivered between the first vehicle on the corresponding first closed loop path and the second vehicle on the corresponding second closed loop path, and the article storage has a first storage and retrieval conveyor provided at a height position lower than the first closed loop path to deliver and receive the article to and from the first vehicle and a second storage and retrieval conveyor provided at substantially the same height position as that of the transfer conveyor so that the second storage and retrieval conveyor and the transfer conveyor can approach each other, the second storage and retrieval conveyor being used to deliver and receive the article to and from the second vehicle. Consequently, the article can be transferred either from the first vehicle, provided with the elevating and lowering device, or from the second vehicle, provided with the transfer conveyor, via the first and second storage and retrieval conveyor, provided in the article storage. Thus, the article storages can be controlled easily compared to the case in which articulated transfer means or the like is provided to deliver the article between the article storage and the vehicle.

As set forth in claim 4, the plurality of first closed paths and the second closed path are connected together, and the first vehicle runs along the first closed loop paths and the second closed loop path, while the second vehicle runs only along the second closed loop path. Urgent articles or the like can be promptly carried from the article placement area disposed below one first closed loop path to the article placement area disposed below another first closed loop path. Further, the articles can be carried more efficiently using the second closed loop path.

As set forth in claim 5, the elevating and lowering device of the first vehicle elevates and lowers the article by moving the article along a running path in a vertical direction. Therefore, the article can be delivered to the article placement area by using the elevating and lowering device to pass the article through the running path in the vertical direction.

As set forth in claim 6, there is provided an automated guided vehicle system comprising a running path including a plurality of first closed loop paths and second closed loop path connecting the first closed loop paths together, and an automated guided vehicle running on the running path, wherein article placement areas are provided below at least the corresponding first closed loop paths of the running path, and a first automated guided vehicle that runs along the first closed loop paths and a second automated guided vehicle that runs along the second closed loop path are provided, wherein article storages are each arranged at a position where the article can be delivered between the first vehicle on the corresponding first closed loop path and the second vehicle on the corresponding second closed loop path, and the first vehicle is provided with a elevating and lowering device that elevates or lowers the article for transfer, while the second vehicle is provided with a transfer device that moves the article in a lateral direction to deliver and receive the article, and wherein an article delivery station provided in the article storage and closer to the second closed loop path is installed closer to the second closed loop path at substantially the same height position as that of the transfer device of the second vehicle. Therefore, the first vehicle can deliver the article to the article placement area and the article storage. Further, the second vehicle can deliver the article to the article storage in a shorter time than the first vehicle.

What is claimed is:

1. An automated guided vehicle system comprising a running path suspended from a ceiling, article storages arranged along the running path, and an automated guided vehicle running along the running path, the automated guided vehicle system being characterized in that the automated guided vehicle is provided with a transfer conveyor and each of the article storages is provided with a storage and retrieval conveyor and in that said transfer conveyor and said storage and retrieval conveyor are arranged so as to approach each other so that an article can be transferred between the automated guided vehicle and the article storage.

2. An automated guided vehicle system according to claim 1, characterized in that a bottom surface of said article is formed to be planar at its laterally opposite ends in a carrying direction and the transfer conveyor and the storage and retrieval conveyor each have a pair of conveyor rows juxtaposed along the carrying direction so that said opposite ends of the bottom surface of the article can be supported by said pair of juxtaposed conveyor rows.

3. An automated guided vehicle system characterized by comprising a running path including a plurality of first closed loop paths below each of which an article placement area is provided and a second closed loop path arranged along the corresponding first closed loop path, a first automated guided vehicle that runs along the first closed loop paths and that is provided with an elevating and lowering device to elevate or lower the article for transfer, and a second automated guided vehicle that runs along the second closed loop path and that includes a transfer conveyor, and in that article storages are each arranged at a position where the article can be delivered between the first automated guided vehicle on the corresponding first closed loop path and the second automated guided vehicle on the corresponding second closed loop path, and the article storage has a first storage and retrieval conveyor provided at a height position lower than the first closed loop path to deliver and receive the article to and from the first automated guided vehicle and a second storage and retrieval conveyor provided at substantially the same height position as that of the transfer conveyor so that the second storage and retrieval conveyor and the transfer conveyor can approach each other, the second storage and retrieval conveyor being used to deliver and receive the article to and from the second automated guided vehicle.

4. An automated guided vehicle system according to claim 3, characterized in that said plurality of first closed paths and said second closed path are connected together, and said first automated guided vehicle runs along the first closed loop paths and the second closed loop path, while said second automated guided vehicle runs only along the second closed loop path.

5. An automated guided vehicle system according to claim 3, characterized in that the elevating and lowering device of said first automated guided vehicle elevates and lowers the article by moving the article along a running path in a vertical direction.

6. An automated guided vehicle system comprising a running path including a plurality of first closed loop paths and second closed loop path connecting the first closed loop paths together, and an automated guided vehicle running on the running path, the automated guided vehicle system being characterized in that article placement areas are provided below at least the corresponding first closed loop paths of said running path, and a first automated guided vehicle that runs along the first closed loop paths and a second automated guided vehicle that runs along the second closed loop path are provided, in that article storages are each arranged at a position where the article can be delivered between the first automated guided vehicle on the corresponding first closed loop path and the second automated guided vehicle on the corresponding second closed loop path, and the first automated guided vehicle is provided with a elevating and lowering device that elevates or lowers the article for transfer to the first automated guided vehicle, while the second automated guided vehicle is provided with a transfer device that moves the article in a lateral direction to deliver and receive the article, and in that an article delivery station provided in the article storage and closer to the second closed loop path is installed closer to the second closed loop path at substantially the same height position as that of the transfer device of the second automated guided vehicle.

* * * * *